Aug. 16, 1966   H. N. UDALL ETAL   3,266,442
FOOD PREPARING APPARATUS
Filed Aug. 31, 1962   22 Sheets-Sheet 1

INVENTORS.
HUMFREY N. UDALL
ANTHONY PETERS
THEODORE OPUSZENSKI
RAYMOND H. VAN WAGENER
MAXIMILIAAN A. KOCKEN
KENNETH W. AUSTIN
BY Arthur J. Plantamura
ATTORNEY.

Aug. 16, 1966     H. N. UDALL ETAL     3,266,442
FOOD PREPARING APPARATUS
Filed Aug. 31, 1962     22 Sheets-Sheet 2
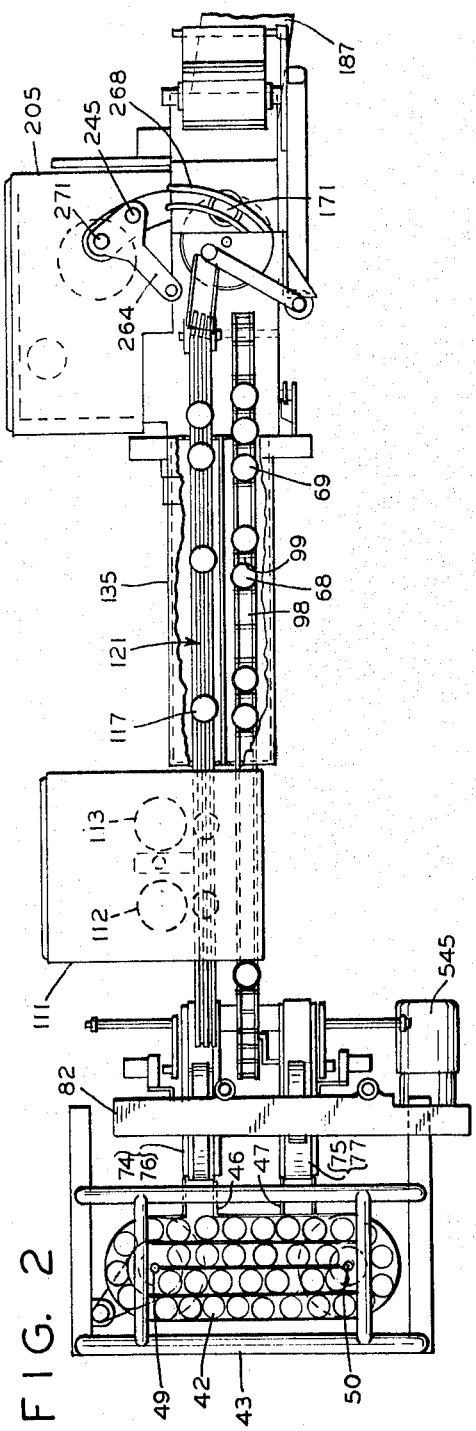
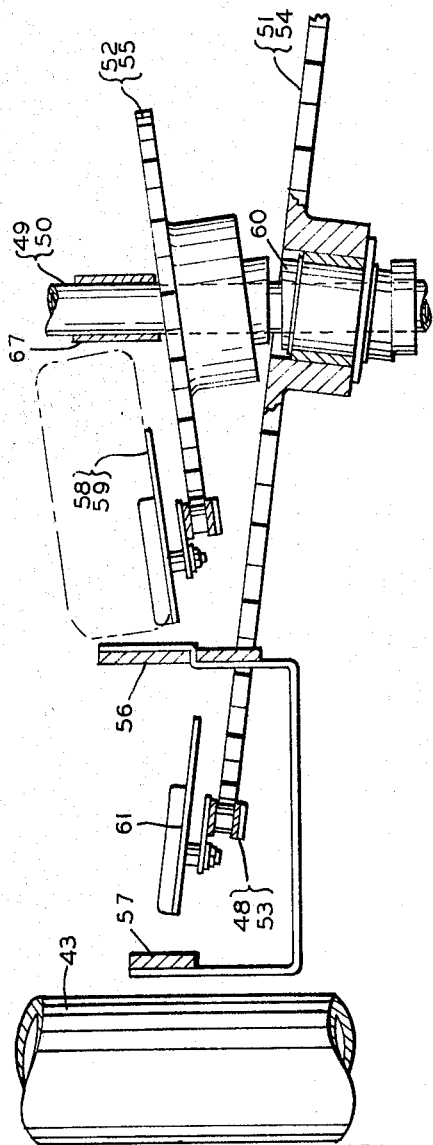
INVENTORS.
HUMFREY N. UDALL
ANTHONY PETERS
THEODORE OPUSZENSKI
RAYMOND H. VAN WAGENER
MAXIMILIAAN A. KOCKEN
KENNETH W. AUSTIN
BY *Arthur J. Plantamura*
ATTORNEY.

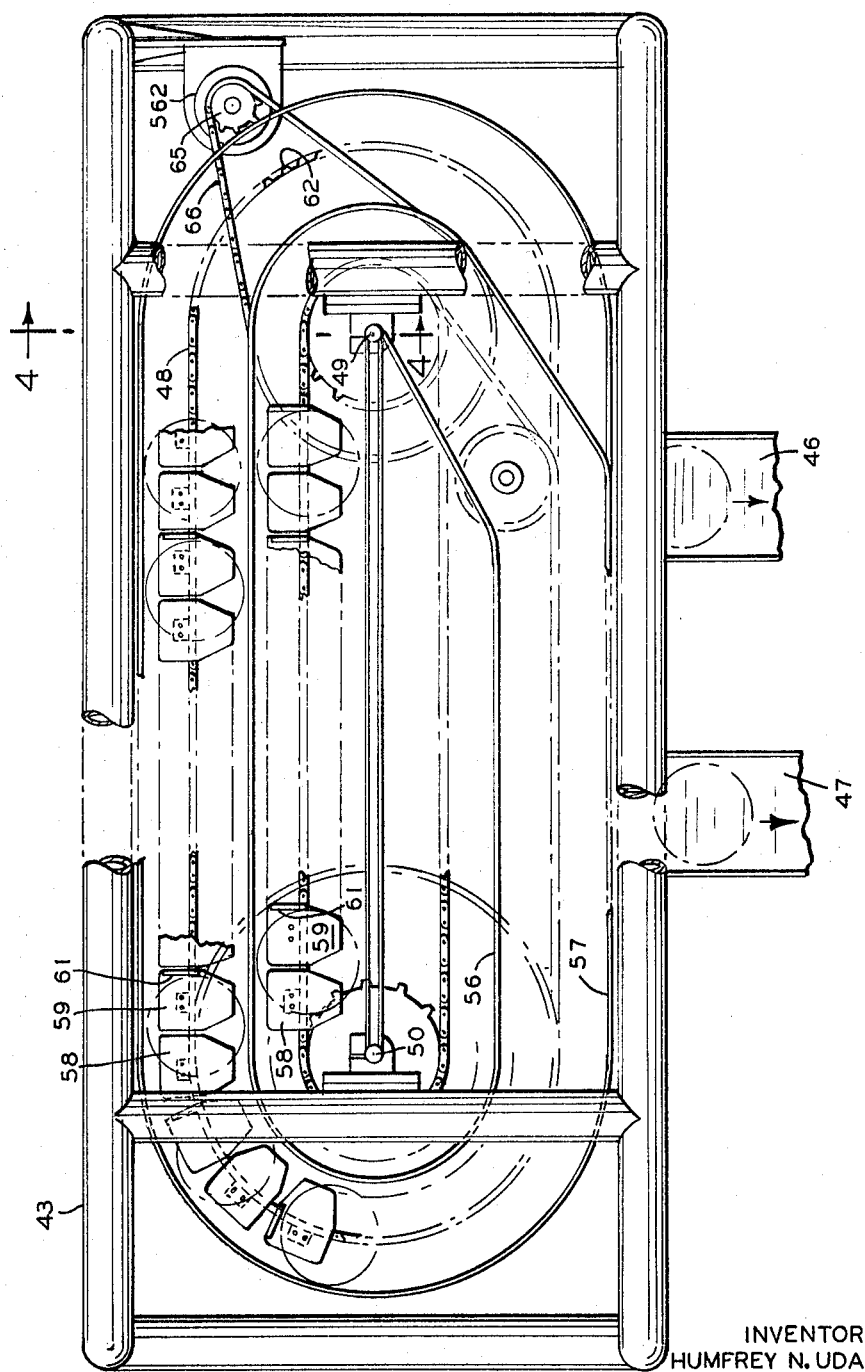

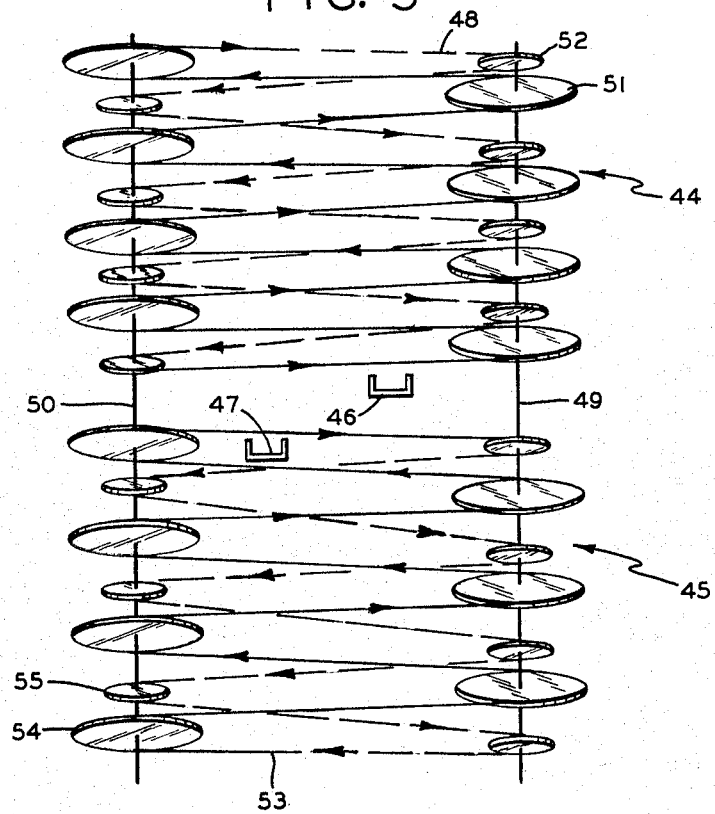

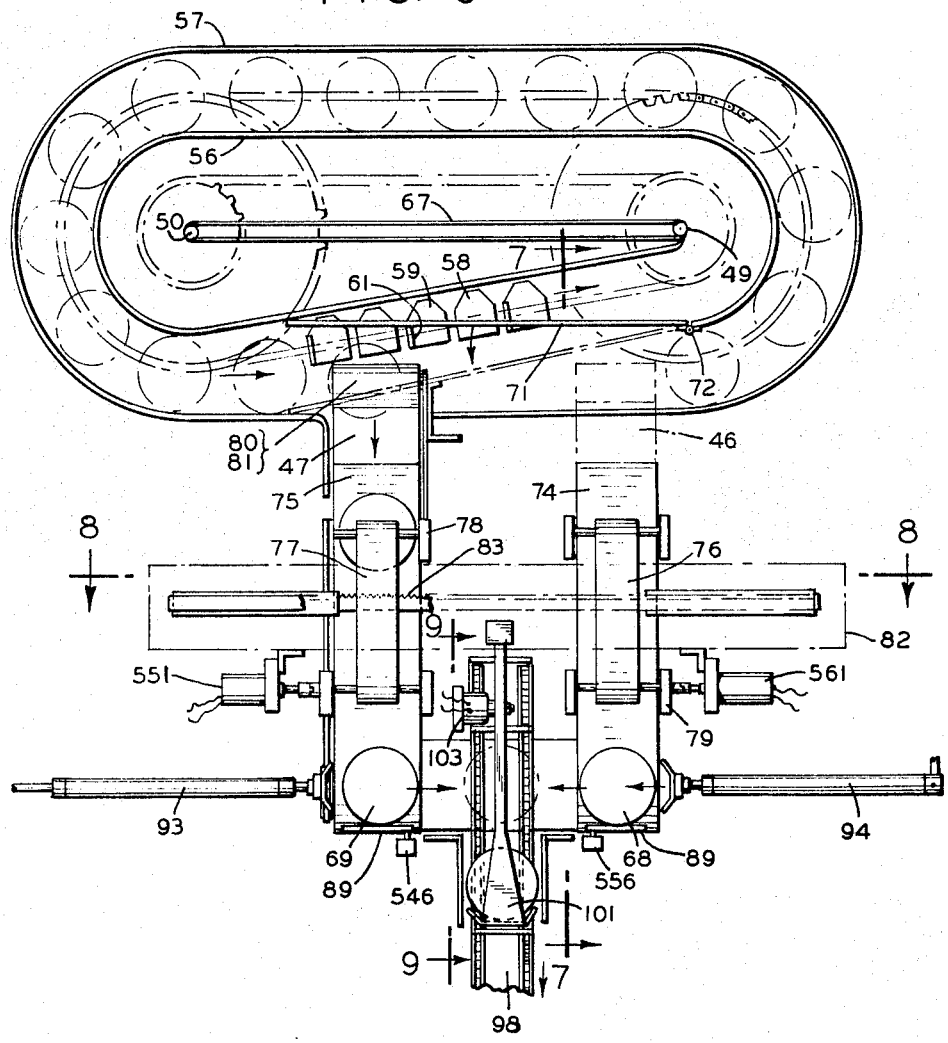

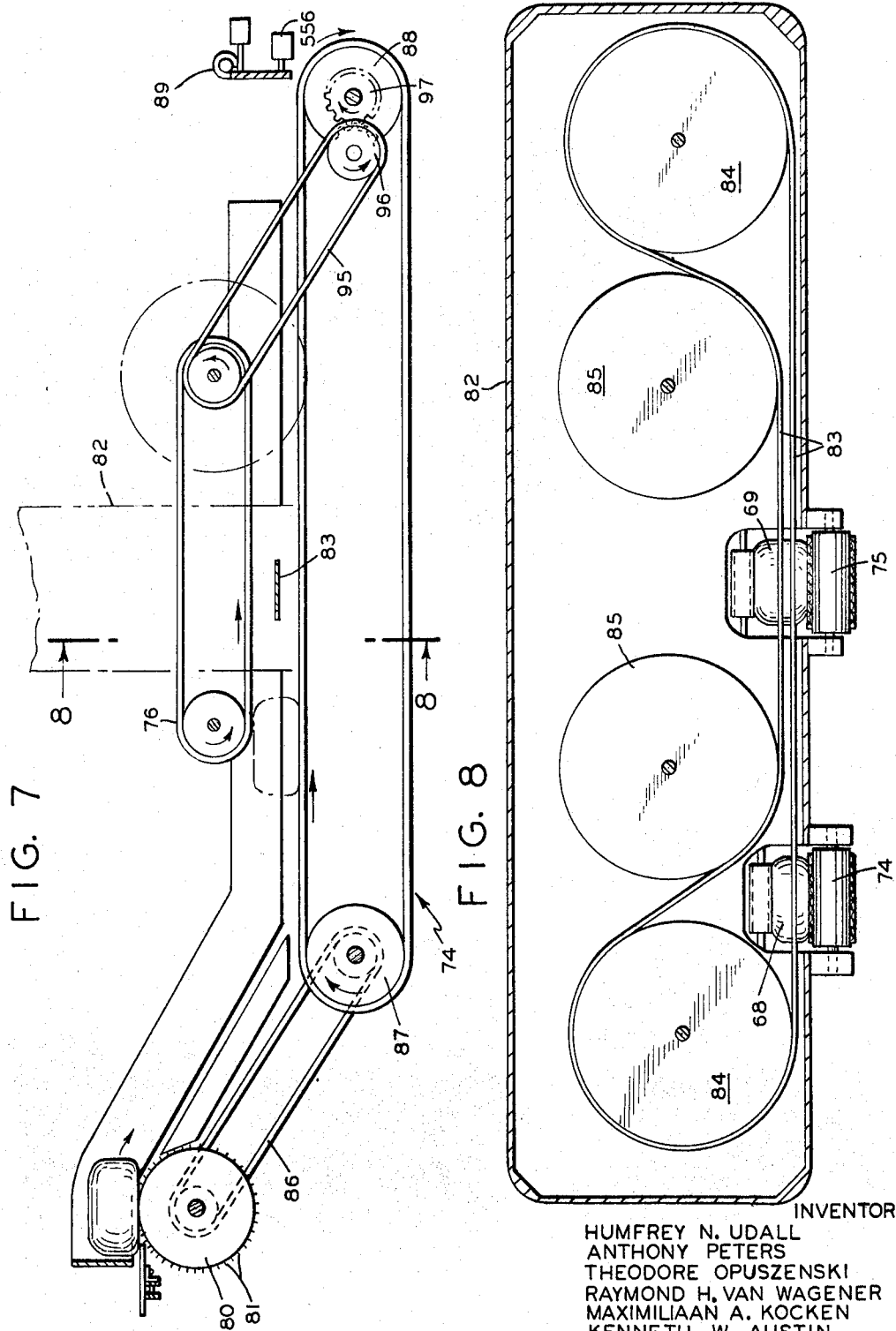

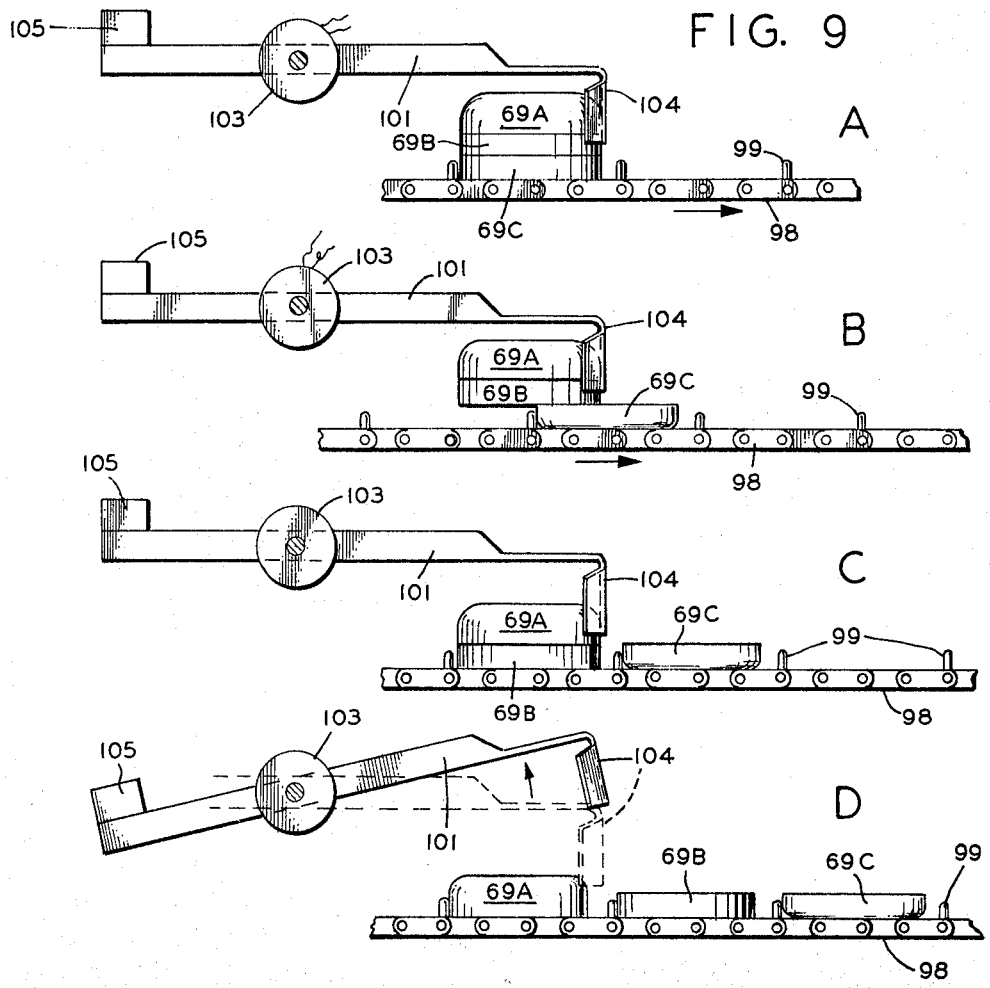

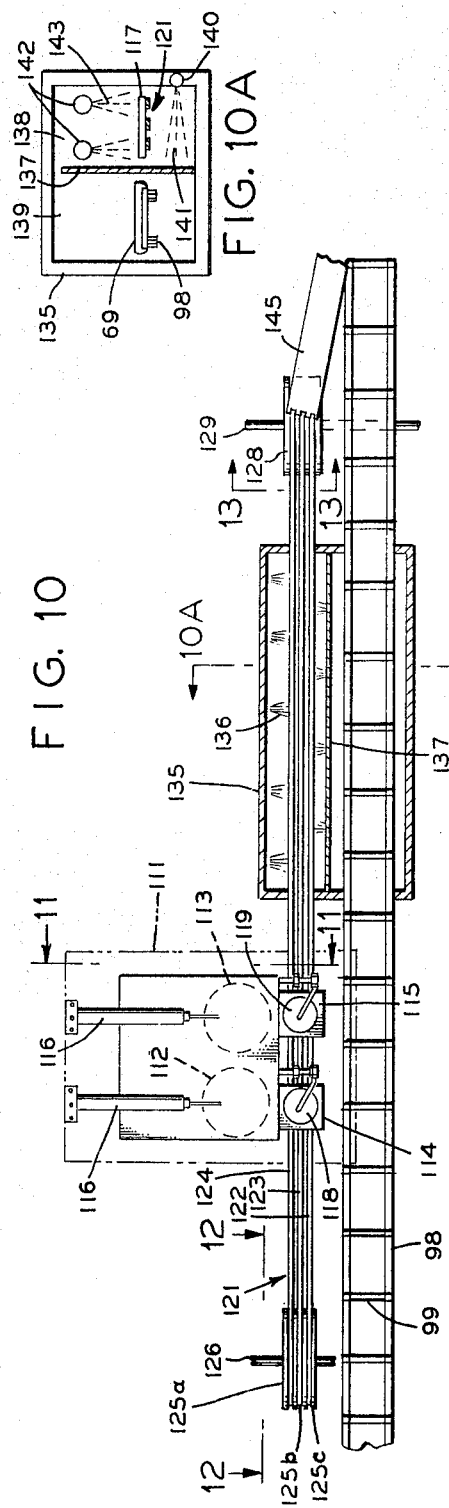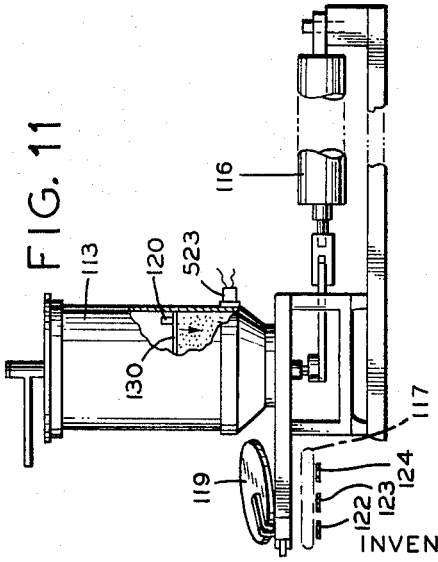

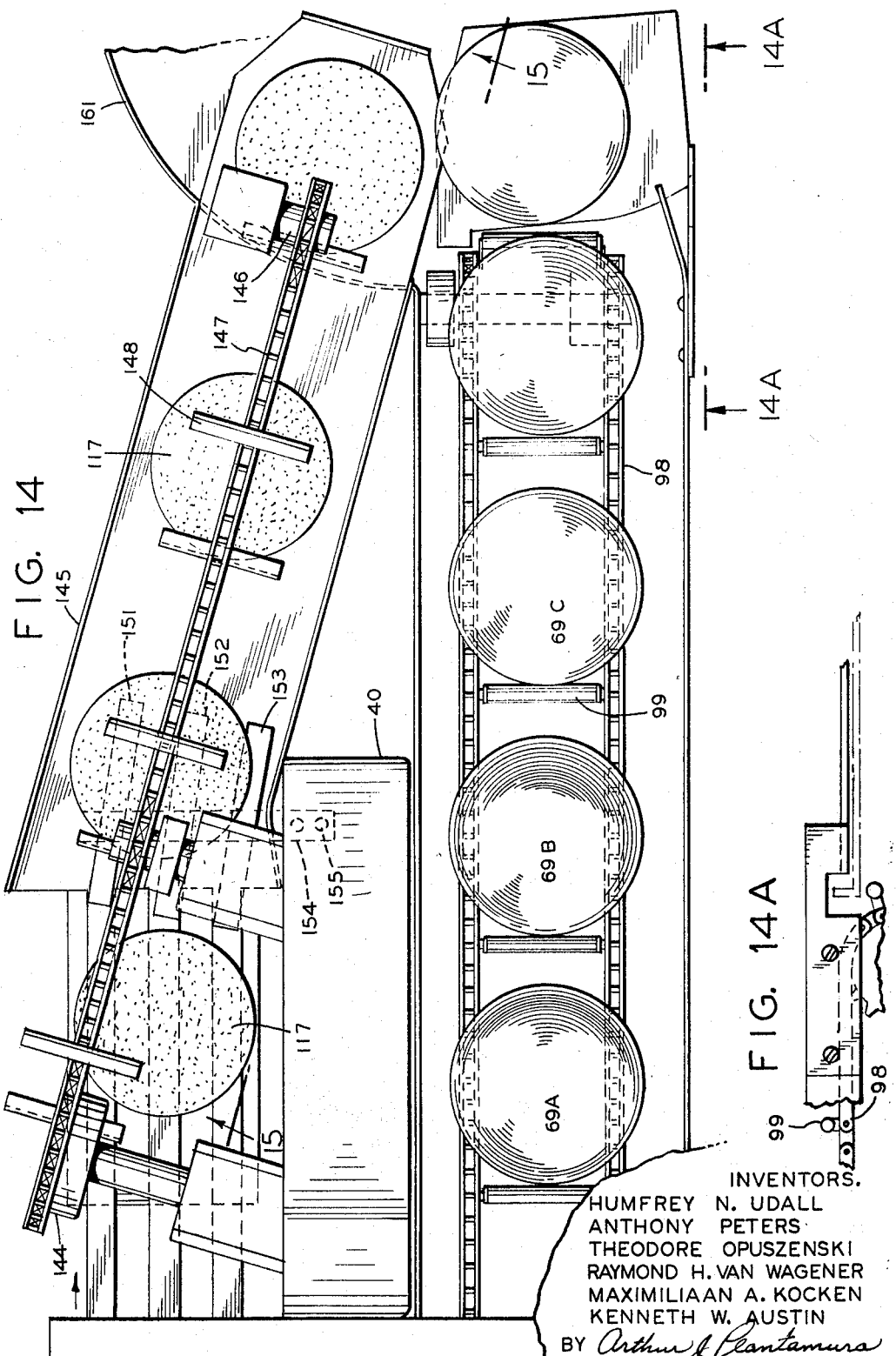

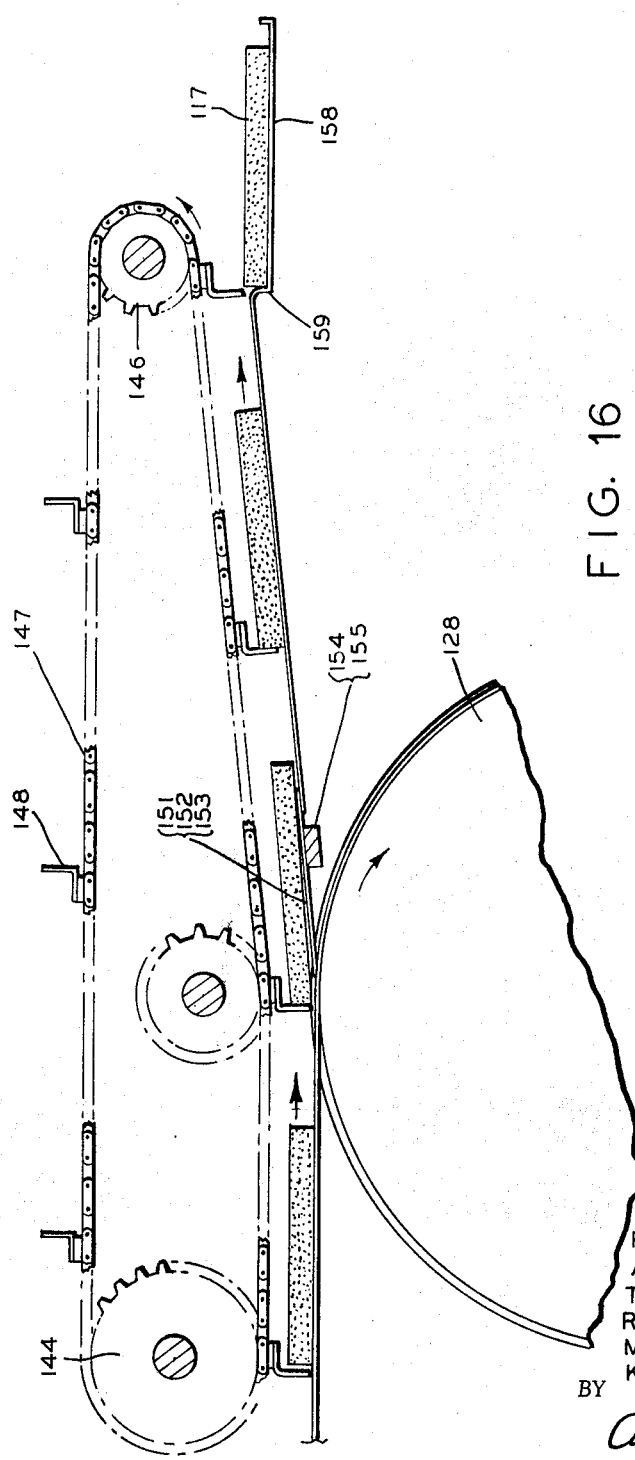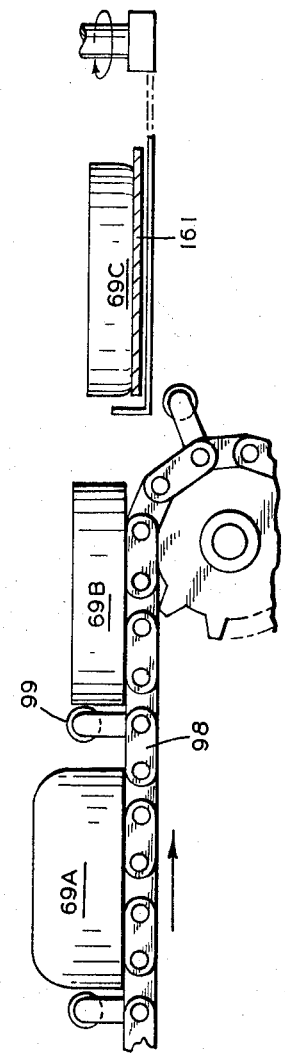

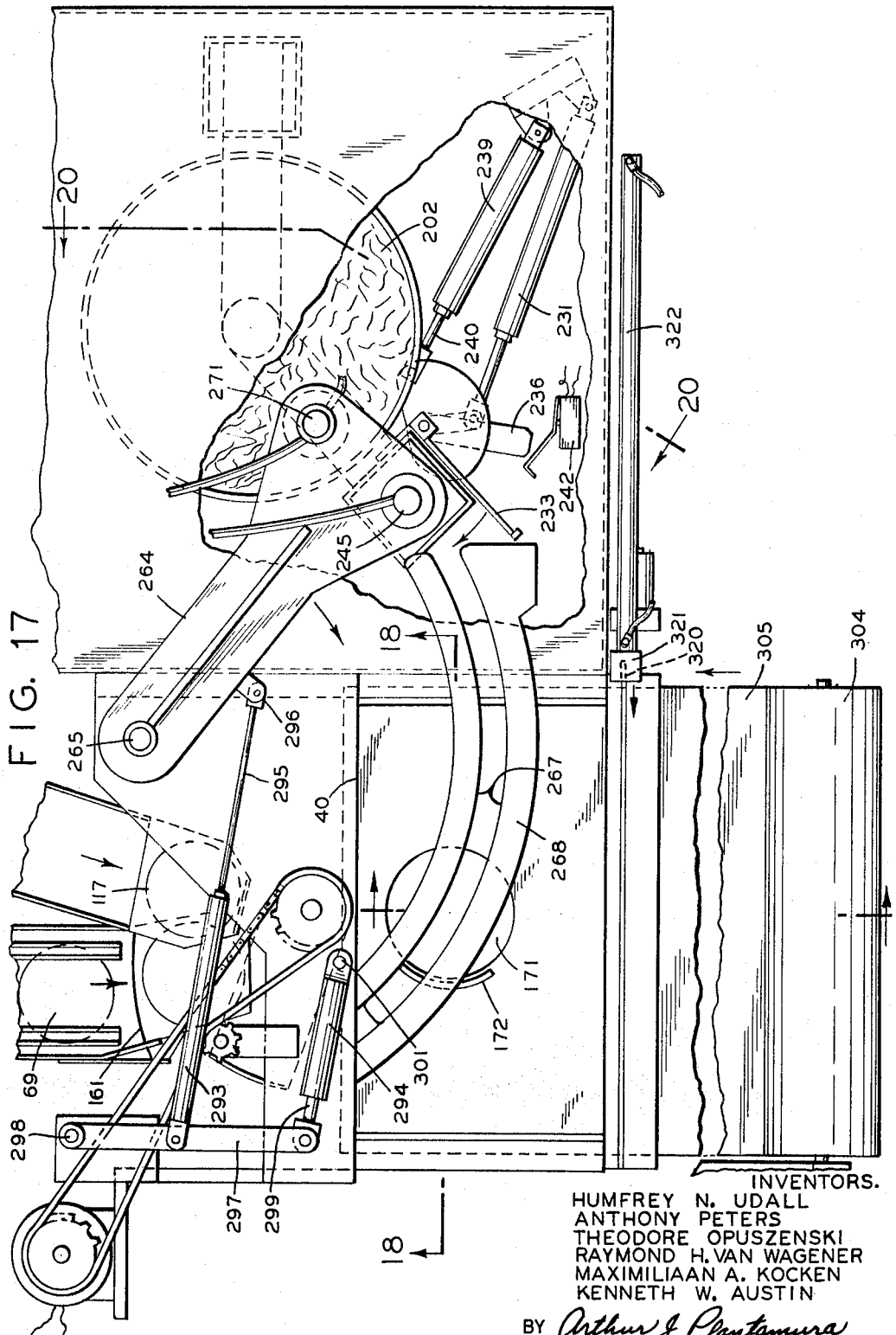

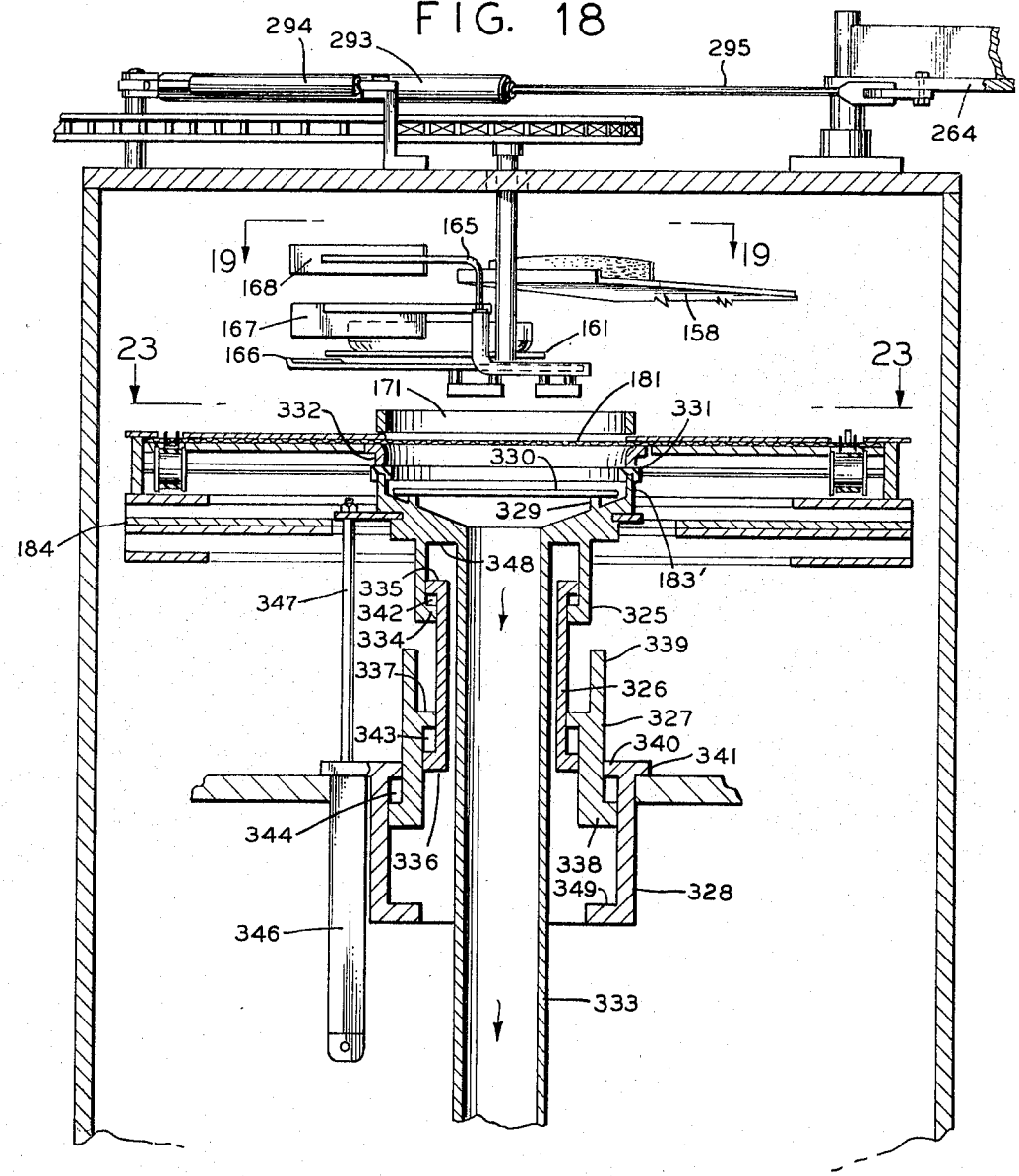

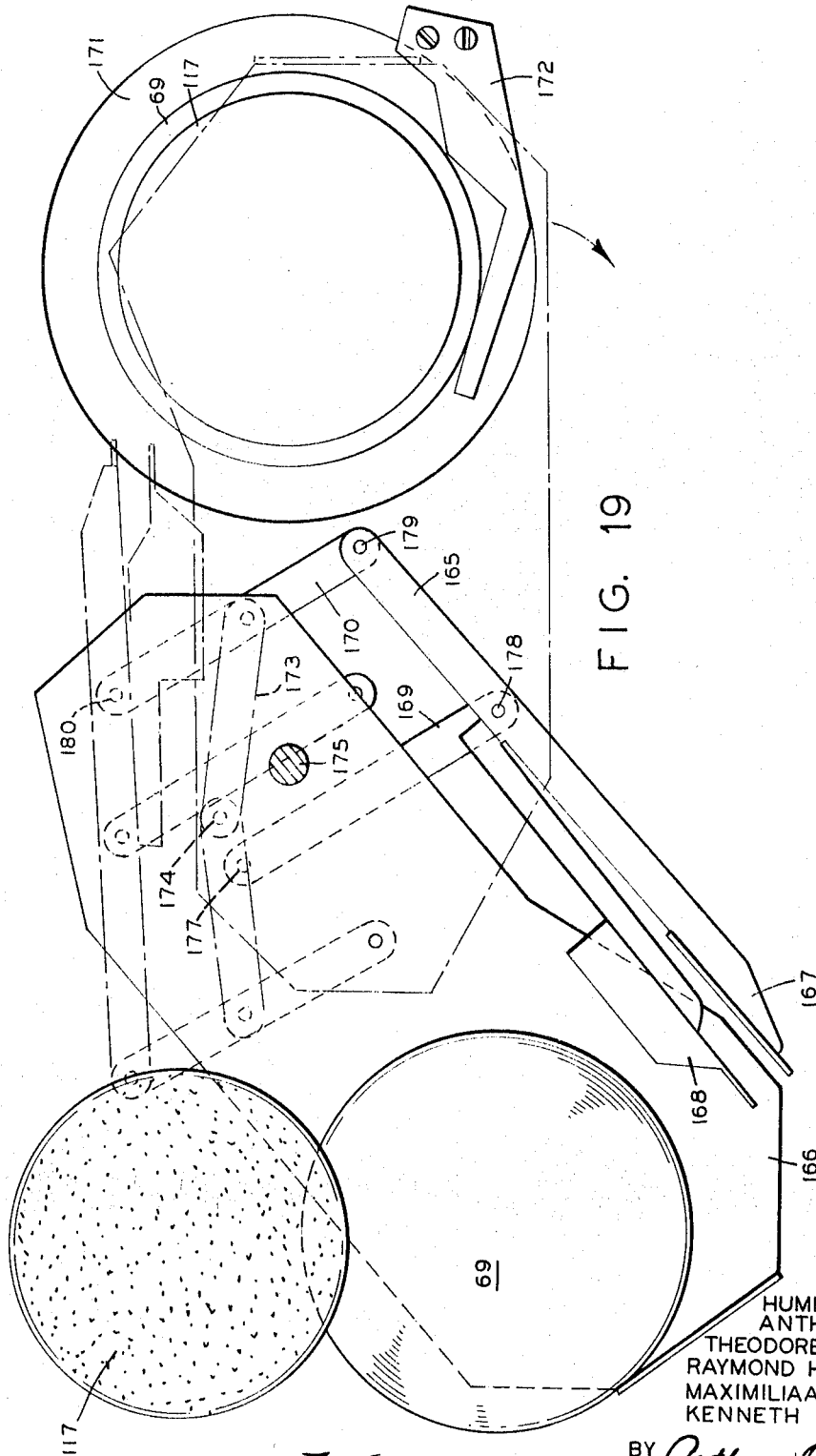

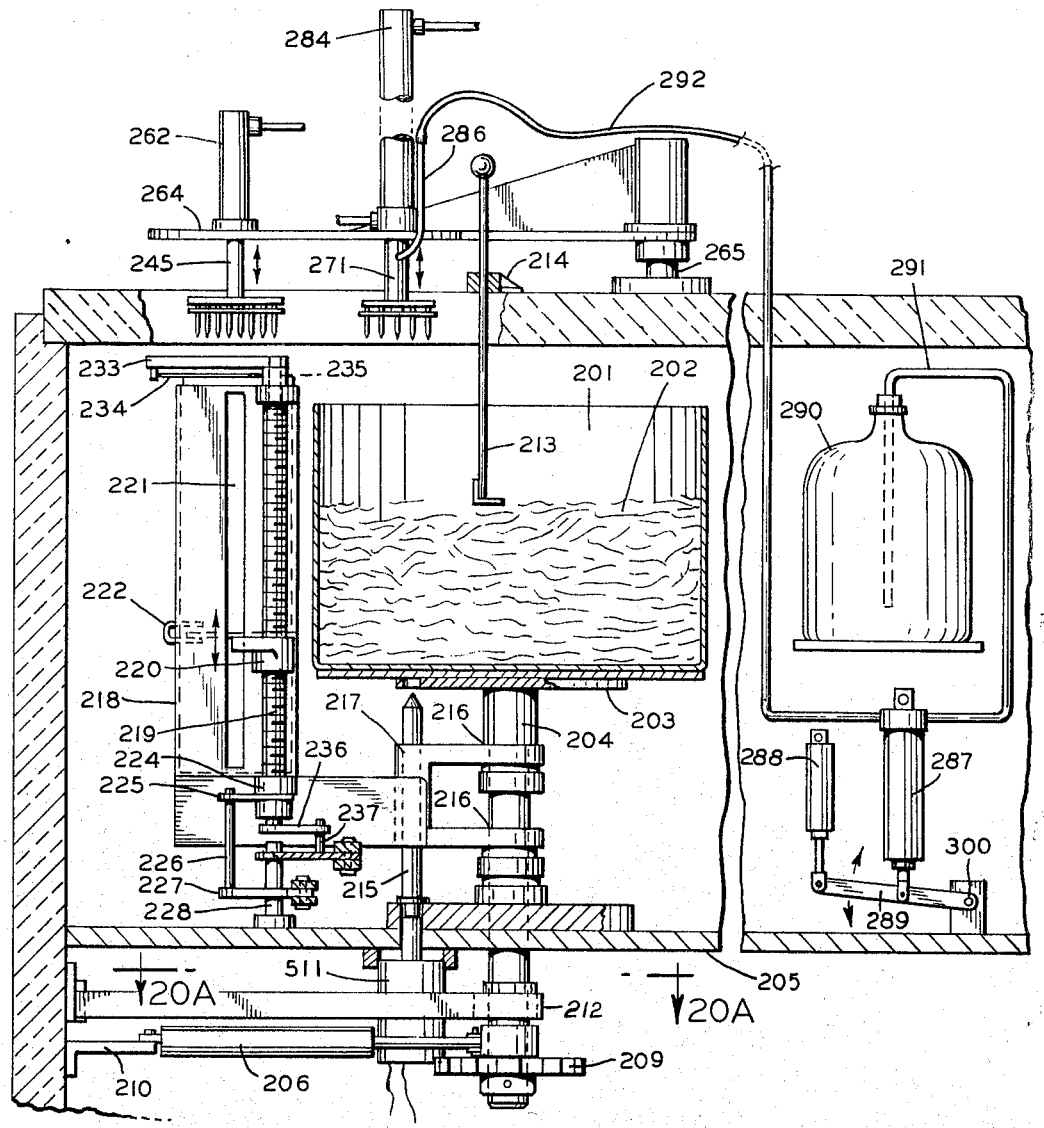

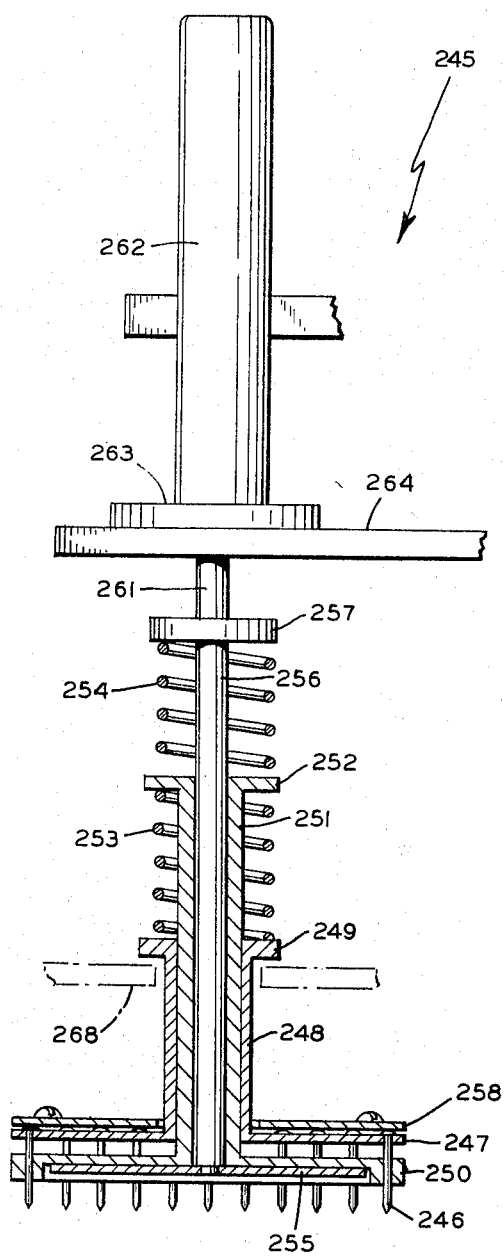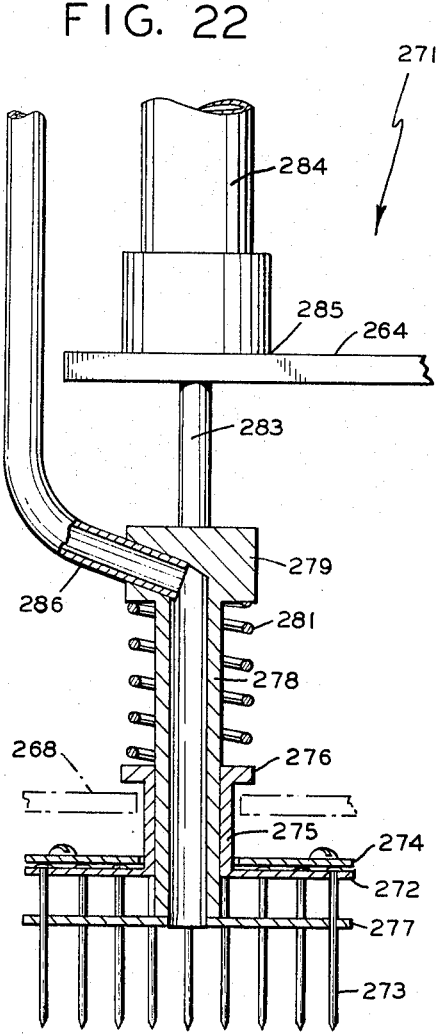

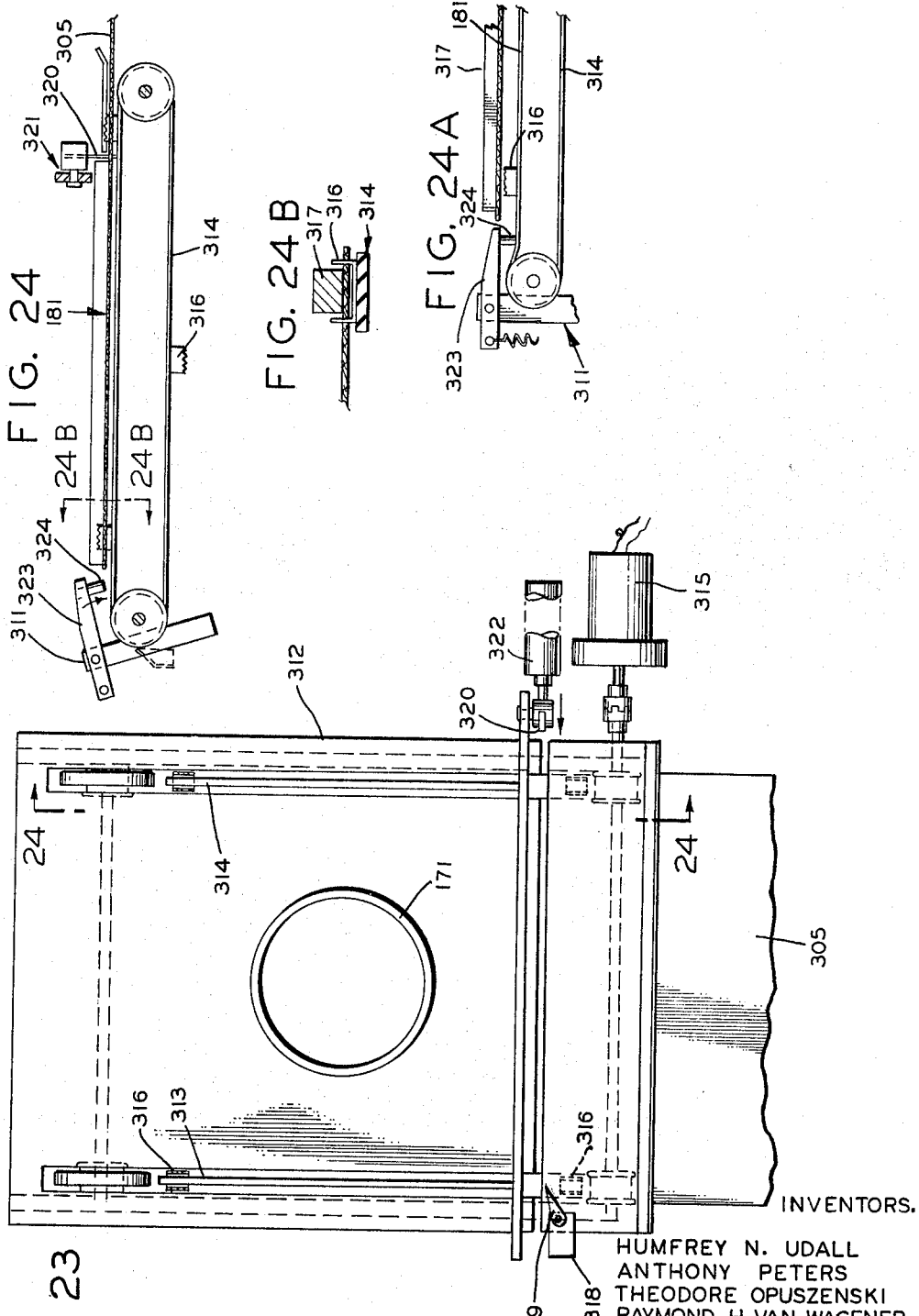

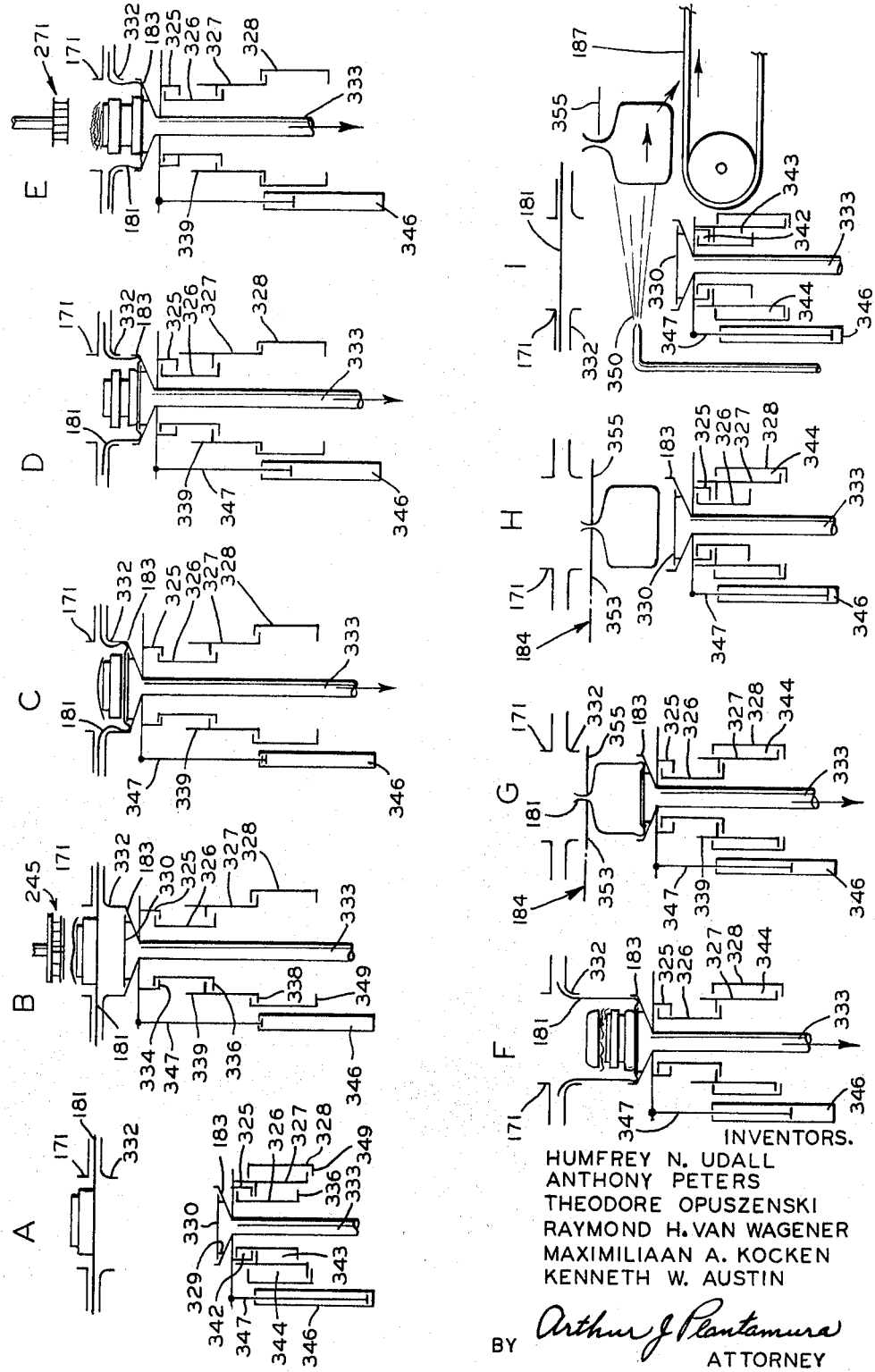

Aug. 16, 1966    H. N. UDALL ETAL    3,266,442
FOOD PREPARING APPARATUS

Filed Aug. 31, 1962    22 Sheets-Sheet 18

INVENTORS.
HUMFREY N. UDALL
ANTHONY PETERS
THEODORE OPUSZENSKI
RAYMOND H. VAN WAGENER
MAXIMILIAAN A. KOCKEN
KENNETH W. AUSTIN

BY Arthur J Plantamura
ATTORNEY.

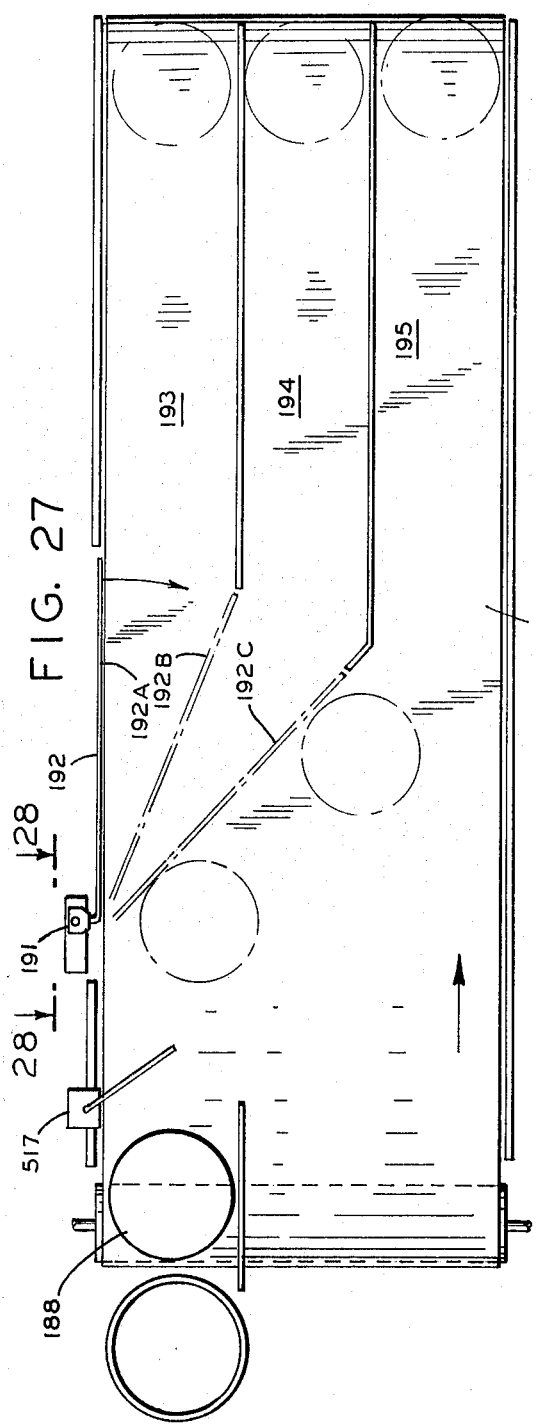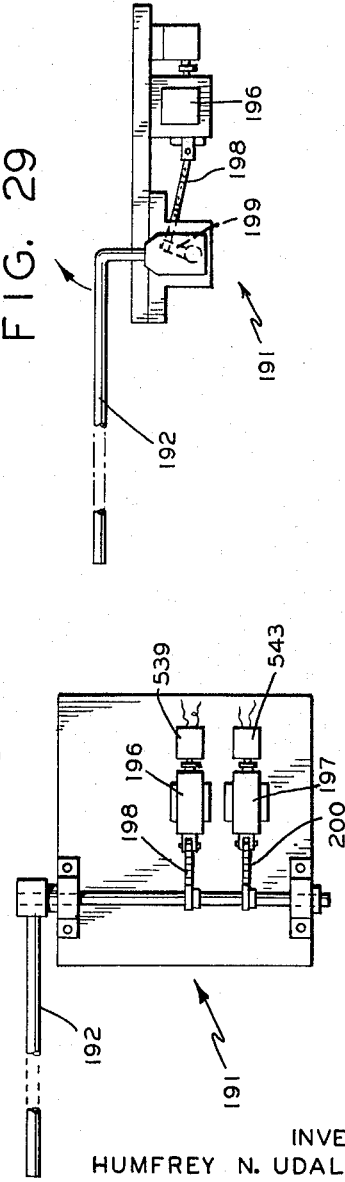

Aug. 16, 1966    H. N. UDALL ETAL    3,266,442
FOOD PREPARING APPARATUS

Filed Aug. 31, 1962    22 Sheets-Sheet 20

INVENTORS.
HUMFREY N. UDALL
ANTHONY PETERS
THEODORE OPUSZENSKI
RAYMOND H. VAN WAGENER
MAXIMILIAAN A. KOCKEN
KENNETH W. AUSTIN

BY Arthur J. Plantamura
ATTORNEY.

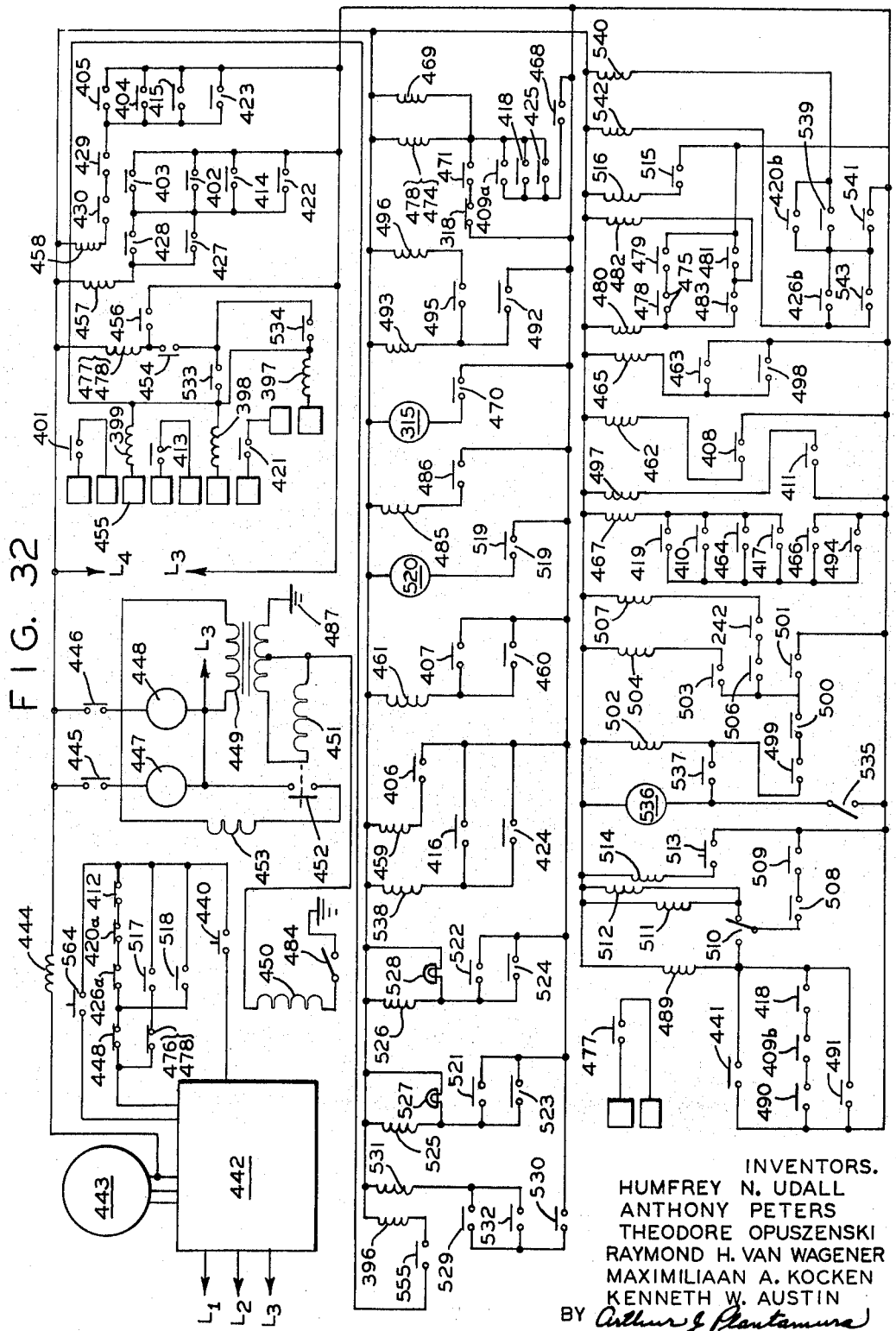

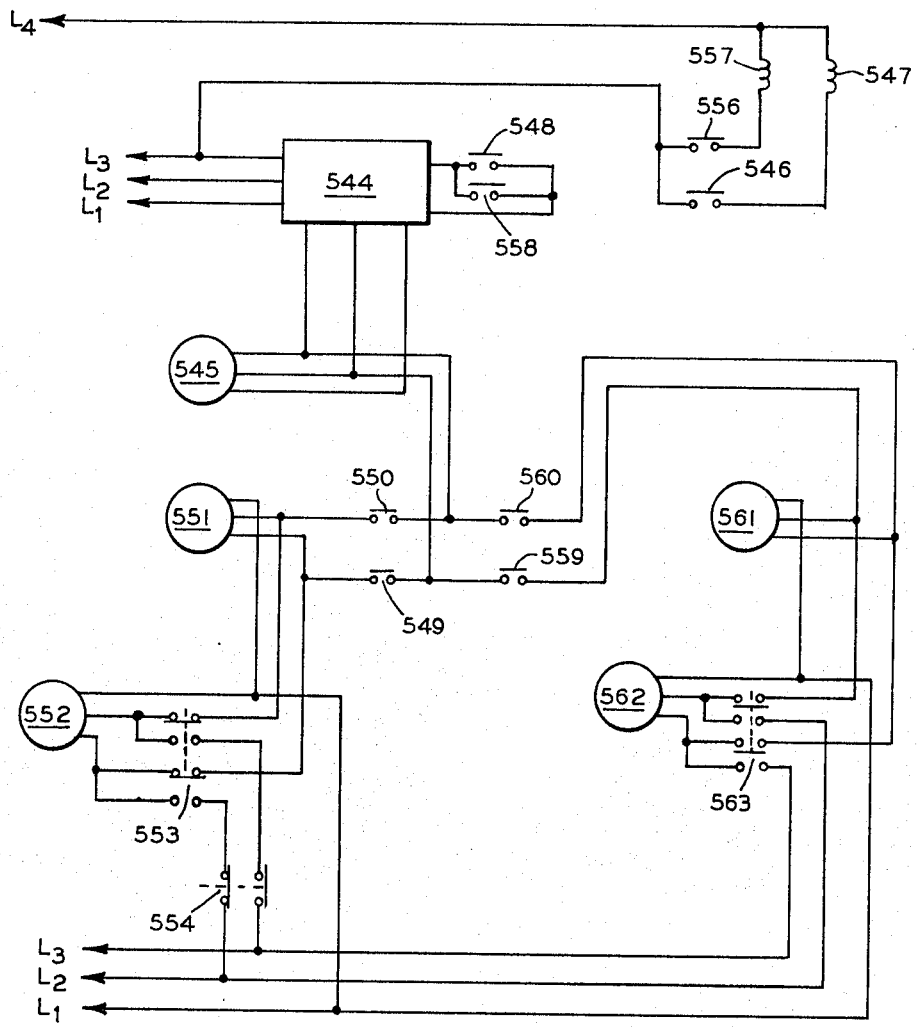

United States Patent Office 3,266,442
Patented August 16, 1966

---

3,266,442
FOOD PREPARING APPARATUS
Humfrey N. Udall, Darien, Conn., Anthony Peters, Flushing, N.Y., and Theodore Opuszenski, Darien, Raymond H. Van Wagener, Noroton, Maximiliaan A. Kocken, Stamford, and Kenneth W. Austin, Milford, Conn., assignors to American Machine & Foundry Company, a corporation of New Jersey
Filed Aug. 31, 1962, Ser. No. 220,615
13 Claims. (Cl. 107—1)

This invention relates to apparatus for automatically feeding, cooking and dispensing food items in the form of sandwiches.

More specifically, this invention relates to a machine for containing in storage the various elements which go into the preparation of various styles of hamburgers and, upon command and without the intervention of an operator, automatically feeding, cooking and assembling the sandwiches according to a preselected order.

It is accordingly a general object of this invention to provide a novel apparatus in which the component parts of various styles of hamburgers may be stored and which functions completely automatically upon command to provide a choice of food items in the assembled state.

It is another object of the invention to provide a hamburger machine in which orders for different styles of hamburgers may be backlogged and processed in the proper order rapidly and fully automatically.

It is another object of the invention to provide a hamburger machine which automatically feeds and slices buns, feeds and molds meat patties, cooks the meat patty, toasts the bun, and assembles the sliced bun and patty into a sandwich.

It is a further object of the invention to provide a machine which prepares completely and automatically and delivers in an assembled state a plurality of styles of hamburgers comprising a choice of (1) plain hamburger, (2) cheeseburger or (3) doubleburger, the last of which includes a triple sliced bun, two meat patties, a slice of cheese and a portion of lettuce and sauce.

It is still a further object of the invention to provide a novel apparatus for automatically slicing cheese and automatically feeding the cheese and optionally a portion of lettuce and sauce for assembly in a hamburger sandwich.

It is an additional object of the invention to provide an apparatus for automatically wrapping the pre-assembled hamburgers and dispensing the wrapped unit.

It is an additional object of the invention to provide an apparatus for selectively delivering the assembled hamburger automatically to a predetermined pick-up station depending on the style of hamburger selected.

Additional objects and advantages of the invention will become apparent as the description of the particular embodiment selected to illustrate the invention proceeds. In the accompanying drawings, like reference characters are applied to the corresponding parts throughout the several views. In the drawings:

FIG. 2 is a plan view of the machine generally.

FIG. 3 is a plan view of the bun storage compartment showing the outlets for the buns or bread rolls.

FIG. 4 is a sectional elevational view of the bun storage compartment taken substantially along line 4—4 of FIG. 3.

FIG. 5 is a schematic view of the movable conveyors which hold and convey the buns in a generally spiral path in the bun storage compartment.

FIG. 6 is a plan view taken substantially along line 6—6 of FIG. 1; it includes the lower part of the bun storage compartment, the bun discharge arrangement, the bun slicer and the sliced bun transfer and destacker arrangement.

FIG. 7 is a sectional elevational view of the bun slicer taken substantially along line 7—7 of FIG. 6.

FIG. 8 is an elevational view of the bun slicer taken substantially along line 8—8 of FIG. 6 and FIG. 7.

FIG. 9 is a side elevational view of the destacking mechanism taken substantially along line 9—9 of FIG. 6 showing the sequence in which a sliced bun is destacked.

FIG. 10 is a plan view of the patty molding unit, the patty and bun conveyors and the oven.

FIG. 10A is a cross sectional view through the oven taken substantially along line 10A—10A of FIG. 10.

FIG. 11 is an elevational view taken substantially along line 11—11 of FIG. 10 showing a patty molder partially in section.

FIG. 12 is a side elevation taken substantially along line 12—12 of FIG. 10 showing the conveyor band idler pulleys, roller guide and scraper mounting.

FIG. 13 is a sectional view taken substantially along line 13—13 of FIG. 10 showing the meat patty conveyor drive pulley.

FIG. 14 is a plan view of the hamburger stripper and pushers and of the bun conveyor converging to the assembly area showing meat patties and bun slices in phantom.

FIG. 14A is a partial elevational view taken substantially along line 14A—14A of FIG. 14.

FIG. 15 is an elevational view taken substantially along line 15—15 of FIG. 14.

FIG. 16 is a partial elevational view of the end of the sliced bun conveyor approaching the assembly station.

FIG. 17 is a plan view of the assembly area and the cheese and lettuce dispensers.

FIG. 18 is a sectional elevational view of the assembly area taken substantially along line 18—18 of FIG. 17.

FIG. 19 is a plan view of the meat patty and bun slice rotary pick-up element including a deck and bifurcated arm which reciprocates thereon.

FIG. 20 is a sectional elevational view of the cheese and lettuce dispensing mechanisms.

FIG. 20A is a view taken substantially along 20A—20A of FIG. 20.

FIG. 21 is a partial sectional view of the cheese pick-up and dispensing head.

FIG. 22 is a partial sectional view of the lettuce pick-up and dispensing head.

FIG. 23 is a plan view of the wrapper feed and cut-off mechanism as seen substantially along line 23—23 of FIG. 18.

FIG. 24 is a vertical sectional view of the wrapper feed mechanism taken substantially along line 24—24 of FIG. 23.

FIG. 24A is a partial view similar to FIG. 24 showing the wrapper stripping action.

FIG. 24B is a sectional view taken substantially along line 24B—24B of FIG. 24.

FIG. 25 is a side view of the bag forming element illustrating in sequence the bag forming operation.

FIG. 27 is a plan view of the exit conveyor mechanism and selective diverter for the assembled sandwiches.

FIGS. 28 and 29 are views of details of the diverter mechanism.

FIG. 32 is a schematic wiring diagram of the electrical system of the machine.

FIG. 33 is a schematic wiring diagram of the electrical system of the bun storage and slicing unit of the machine.

Figure 1:
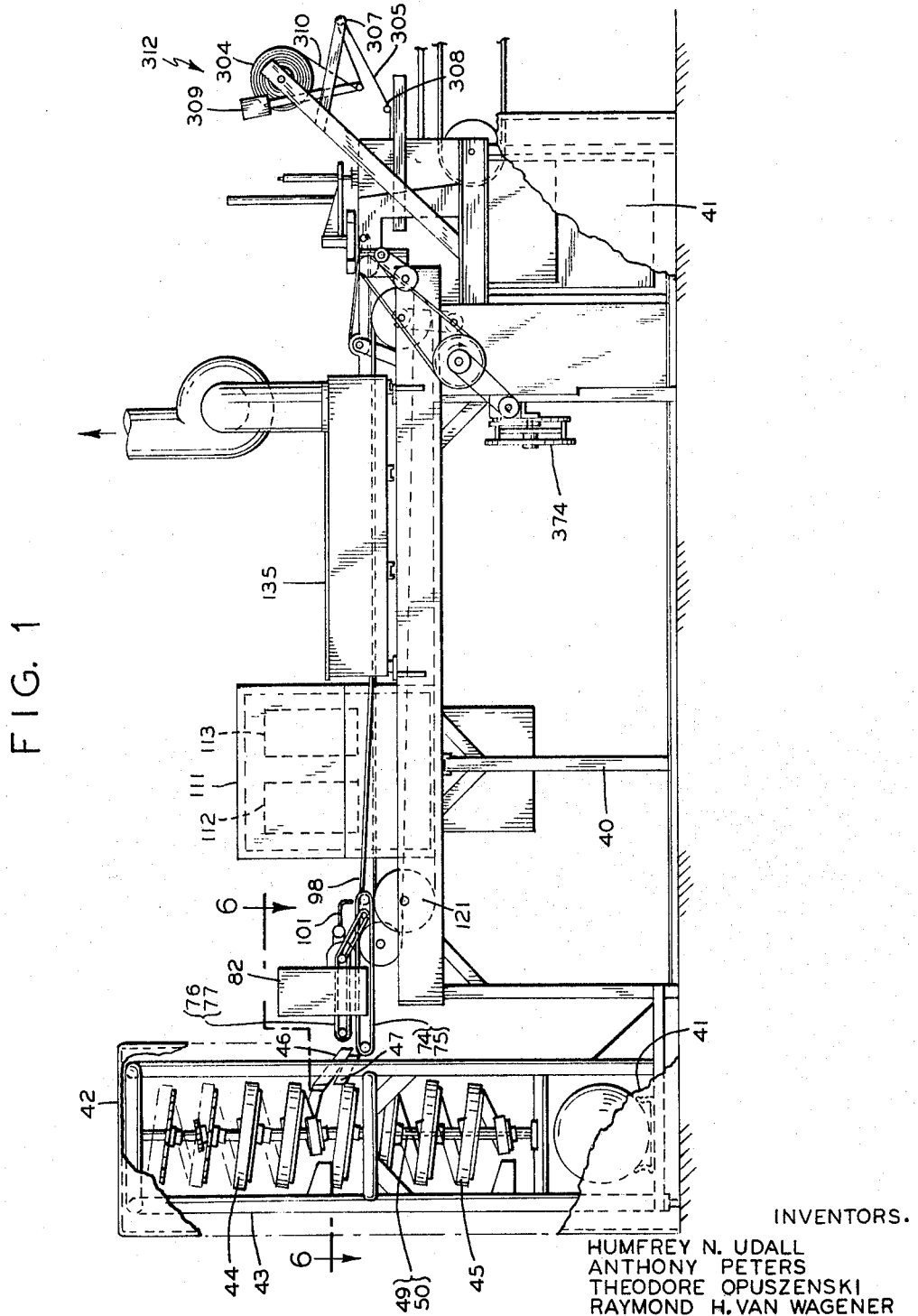
FIG. 1 is a side elevational view of the machine generally.

Referring initially to the general arrangement of FIG. 1 and FIG. 2 of the drawings, 40 designates the frame of the machine over which a suitable removable enclosure 41 comprising covers or panels is positioned.

The elements forming the machine include a bun store 42 which comprises two distinct endless conveyors, an upper conveyor 44 and a lower conveyor 45 contained within frame 43 and arranged to accommodate varying sizes of buns or rolls. The buns are delivered from the store 42 through bun exit chutes 46 and 47 onto conveyors 74 and 75 and then proceed between said conveyors and conveyors 76 and 77 to where they are sliced by endless blades of slicer mechanism 82. The sliced bun is thereafter destacked by element 101 so as to be conveyed as single slices and transferred to bun conveyor 98 and conveyed thereon through oven 135 to the assembly area. Patty molding units, two of which are illustrated, 112 and 113 are contained within refrigerated cabinet 111. Upon suitable impulse through pneumatic cylinders 116, these units mold and deposit meat patties 117 on the patty conveyor 121 which passes through oven 135. After the patties have travelled through the oven, they are delivered to the assembly area where they are assembled as sandwiches in the sliced bun. At the assembly area, cheese or alternately cheese, lettuce and sauce, contained in a second refrigerated cabinet 205, may be dispensed for inclusion in the sandwich. Thereafter the assembled sandwich is wrapped at 171 by dispensing and cutting a wrapper from the roll and delivered to the output conveyor 187 which transports the sandwich to a designated station. The entire operation is effected automatically.

Storing and delivery of buns

Referring now in greater detail to the drawings, particularly FIGS. 1, 3 and 5, the bun store section 42 consists of two independent spiral chain conveyors 44 and 45 which are supported on non-rotating posts 49 and 50 by means of sprocket disks 51 and 52. The discrete arrangement in which two independent conveyors are used permits the use of the bun store for different size buns. Thus, conveyor 44 is used for hamburger or cheeseburger buns of conventional size and the lower conveyor 45 for buns or rolls of greater depth, more suitable for cutting into three slices for doubleburgers. The conveyors 44 and 45 comprise a continuous chain 48 and 53, respectively, wrapped spirally around a number of large sprockets 51 and 54, respectively, and smaller sprockets 52 and 55, respectively which are secured askew for rotation on posts 49 and 50 by means of suitable bushings as shown more clearly in FIG. 4.

The chain in order to effect the endless arrangement follows a route around one size sprocket in the upward direction and another size in the downward direction. The lower conveyor is wound so as to move up on the larger sprockets 51 and return down on the smaller sprockets 52. The upper conveyor follows the reverse pattern.

Secured to the links of the chains 48 and 53 and movable therewith are bun carrying plates 58 and 59. In the embodiment shown, two of these bun carrying plates have a cross-section substantially equal to the diameter of a bun. As shown, in each pair of plates, plates 58 are flat as distinguished from plates 59 which preferably have a lip 61 on their trailing edge for the purpose of assuring more positive movement of the buns.

While a lesser number of plates with lip 61 may be used, preferably the plates 58 and 59 are spaced so that compartments between the lips accommodate but a single bun.

Stationary guides 56 and 57 are provided which follow the chain spiral and ensure that the buns remain on the plates 58 and 59 with their centers located substantially on the chain center line. These guides are suitably shaped to follow the chain path at the top and bottom of the spiral where the chain moves from the outer to the inner spiral, as shown in FIGS. 3 and 6. The guides 57 may conveniently be supported from the main support structure 43, and the guides 56 by radially disposed arms from the stationary posts 49 and 50.

Each of the sprockets around which the bun carrying chains are rotated is mounted to rotate freely on bushings 60 and is suitably tilted so as to permit the hereinabove described movement, i.e. where the direction of movement of the conveyor is upward on the conveyor chain wound around the large disks 51, the large disks are tilted on the supporting posts 49 and 50 so as to best accommodate the movement and the smaller disks are angled on these posts so as to best accommodate winding of the chain in the opposite direction.

To rotate the conveyors, any suitable arrangement may be used. As shown in FIG. 3, a driving sprocket 62 preferably connected to the lowermost sprocket 51 and driven by motor 562 through sprocket 65 and main 66 is employed. Rotation of sprocket 51 with the chain mounted thereon effects the rotation of the entire conveyor chain. A separate drive which may be of similar configuration is preferably employed to rotate the second conveyor independently.

Delivery of the bun from the store 42 is effected through exit chute 47 for the upper conveyor. For this purpose, a diverter or deflector is suitably hinged or pivoted at 72 on one end of the guide 56 whose other end is secured to a frame member 67 connecting posts 49 and 50 (shown in FIG. 6) so as to direct the buns into the chute opening. In its normal position, diverter 71 deflects the buns off the conveyor 44 onto bun pick-up roller 80 which is rotated at a somewhat greater linear speed than the conveyor to assure prompt removal of the bun from the conveyor and affirmative disposition of the bun onto the exit chute. When the conveyor 44 is in the process of being loaded, the deflector 71 is manually pivoted into the position shown by broken lines in FIG. 6, thus causing the bun to remain on the conveyor and to by-pass the pick-up roller 80 situated at the head of the exit chute 47 so that the whole conveyor chain may be filled with buns. A similar arrangement (not shown) is used to deflect buns from the lower conveyor into exit chute 46.

In refilling the bun store 42 at any stage of depletion, the deflector is set so that the discharge opening to the chute is closed by pivoting the deflector 71 to the position shown in broken line in FIG. 6, resulting in an endless circuit of the buns. In so doing, the first portion of the chain passing the refilling station which is conveniently positioned substantially at the opposite side of the chutes 46 and 47, is that carrying the remaining buns. For this purpose, the system is arranged so that the motor which drives the conveyor may be alternately manually energized independently of the automatic system. After refilling, deflector 71 is reset to the position shown in solid lines in FIG. 6 and the machine is returned to automatic operation.

As the buns are diverted to the head of the chute 46 or chute 47, they are picked up by roller 80 which is preferably constructed with a grip enhanced surface such as by knurling or as shown by having pins 81 projecting from the surface to promote more positive transfer of the buns down the chute. Rotation of rollers 80 is preferably at a faster liner speed than conveyors 44 and 45 and conveyors 74 and 75, and said roller, may conveniently be driven by belt connection 86 to pulley 87 of conveyor 74.

Bun slicing and destacking

As the buns are delivered to the base of chute 46 (see FIG. 7) they are picked up by conveyor 74 and then securely retained between conveyor 74 and conveyor 76. A slicer 82 is disposed so that as the bun is gripped between these conveyors 74 and 76, it is sliced as a cutting band 83 passes between the conveyors at an elevation to provide the desired cut. The sliced bun in its stacked condition is carried until it contacts vane 89 which operates switch 556. The switch 556 through a suitable electrical connection turns off the conveyor drive motor 562, the drive 561 for the slicer conveyor and the drive to the slicer blade 83.

Upon suitable impulse, the bun delivered by conveyor 74 and positioned against plate 89 is fed off conveyor 74 by air cylinder 94. In this movement, vane 89 under influence of a counterweight moves away from switch 556 which thereupon energizes the three drives above so that another bun is fed, sliced and positioned against vane 89. A similar arrangement is used for the double bun except that the slicing band passes twice through the bun thus slicing it into three layers. It is thus seen that the stacked sliced buns delivered from the double sliced bun side as well as from the triple sliced bun side are conveniently transferred to the single conveyor 98 where the buns are suitably destacked into a sequence of single slices by the destacker unit hereinafter described.

The configuration of the slicing band 83 is illustrated in FIG. 8, and comprises essentially a commercially available slicer[1] modified to enable both single and double buns to be sliced without adjustment of the mechanism. As shown, the slicer housing 82 contains a pair of outer pulleys 84, one of which is driven, and a pair of inner pulleys 85 around which the cutter band or saw-blade 83 is wrapped. A common drive motor 561 (see FIG. 6) may be employed to drive both conveyors 76 and 74 in the direction of the arrows by means of belt drive 95 and gears 96 and 97 (see FIG. 7). Alternate slicing mechanisms may also be used. Conveyors 75 and 77 are similarly driven by motor 551.

As shown in the arrangement, either a single bun or double bun is pushed by air cylinder 94 or 93, respectively, onto the bun conveyor 98. Conveyor 98 is compartmented by bun separator bars 99. Conveyor 98 is preferably arranged so as to move intermittently by means of a pneumatically operated drive and has an interval of motion equal to the linear distance between bars 99 which form a compartment or separation for each slice of the bun. As a sliced stacked bun 69 passes under a pivotable destacker arm 101, the destacker wiper plate 104 retains all but the lowermost slice. The action occurring with a bun sliced in three parts will now be described in connection with FIG. 9 of the drawings. As the conveyor 98 advances with the stacked bun positioned between separators 99 and in contact above with plate 104, only the bottom slice 69C is carried forward on conveyor 98. Upon the next indexed motion of conveyor 98, the slice 69B now occupying the bottom position and also compartmented between bars 99 is permitted to move forward while the top slice 69A is retained by plate 104. When only a single slice remains, a solenoid 103 is de-energized allowing arm 101 to pivot. This allows plate 104 to lift aided by counterweight 105 thus enabling the top slice, which is generally irregularly higher, to pass freely.

In the case of a single bun, the arm 101 is similarly raised after the lower slice has passed, i.e. after the first of the two slices has moved ahead. The solenoid 103 as hereinafter described is programmed through a suitable memory device. The slices of the bun after separation are carried on conveyor 98 through an oven 135 more fully described hereinafter where it is warmed or toasted and thence delivered to an assembly station.

Meat patty molding and cooking

Suitably situated on frame 40 is refrigerated cabinet 111 which houses a pair of patty molding units 112 and 113. Although it will be apparent that a single meat hopper and molding unit of this kind may be used, two are preferred because this enables continuous operation, i.e. as one is exhausted, the other is automatically put in use while the alternate is being filled without interrupting productive operation. The meat hopper and molding units 112 and 113 are essentially of commercially available configuration such as are obtainable as Model C-20 from Patented Appliances Inc., 40 Scoville Street, Torrington, Connecticut, and comprise generally cylindrical hoppers containing ground meat to which a patty molding plate is affixed. In the meat hopper, a pressure plate 130 through a screw turned by a ratchet device forces the ground meat through an aperture in the base of the hopper into mold plate 114 or 115. The mold plate containing a formed patty in its mold is slid out laterally by means of a pneumatic cylinder 116 to a position where the molded meat patty 117 is ejected by knockout plungers 118 and 119. Through the action of these plungers, the molded meat patties 117 are deposited on conveyor 121 which preferably comprises at least two spaced heat resistant non-corrodible metallic bands. When the meat hopper is substantially empty, the magnet 120 mounted on the pressure plate 130 is brought into closer proximity to the magnetically operated reed switch 523 (FIG. 11). The signal from this switch causes this patty-maker to shut down and the alternate patty-maker to start functioning. As shown, the conveyor 121 comprises three bands 122, 123 and 124 supported on a grooved driving sheave 128 carried by shaft 129 at the exit end of the conveyor and at the other end around individual take-up pulleys 125A, 125B and 125C which are loaded to automatically adjust these bands to compensate for expansion. Although the conveyor 121 may comprise a single band or even a wire or mesh structure, the arrangement of flat bands as disclosed provides the optimum structure in that it permits the meat patty to be cooked on both sides simultaneously thereby allowing rapid cooking. The smooth band structure also facilitates cleaning of this conveyor to which, by nature of the product and the cooking process, a certain amount of meat invariably adheres. A mesh conveyor on the other hand presents a serious cleaning problem.

The conveyor 121, as is the case with the bun conveyor 98, is driven by a pneumatically operated intermittent drive and is arranged to be in timed relationship with the bun conveyor 98. The timing is such that the patty conveyor 121 is made to advance two spaces during a time interval in which the bun conveyor 98 moves three spaces. The purpose for this timing sequence will become more apparent as the assembly of the sandwich is described hereinafter.

As shown more clearly in FIG. 10, the molded patties deposited on conveyor 121 move out of the refrigerated cabinet 111 and into the oven 135 where they are cooked and preferably broiled to the desired degree.

Oven

The oven 135 comprises essentially a rectangular insulated housing having a longitudinal divider or separator 137 preferably constructed of metal which separates the patty broiling compartment 138 from the bun toasting compartment 139. The compartment 138 is preferably heated by a line gas burner 140 running longitudinally substantially the length of the oven and having a flame 141 directed below the conveyor 121, see FIG. 10A.

The compartment 138 is preferably further provided with a source of secondary air 143 provided by longitudinal conduits 142 situated so as to provide combustion promoting air above the conveyor 121. By this arrangement, it has been found that primary combustion of the gas occurs below and secondary combustion above producing simultaneous broiling of the meat patty on both sides. A conventional temperature control device (not shown) may be used to maintain proper broiling tem-

---

[1] The housing, power unit and pulley elements of the slicer are components of commercial bakery unit available as Uni-Pac from Bakery Machinery Division, American Machine & Foundry Company.

perature in chamber 138. The bun toasting chamber 139 is heated indirectly from the combustion in chamber 138. The oven divider 137 may comprise various configurations depending on the amount of heat it is desired to admit to chamber 139. As shown, a stainless steel divider 137 is utilized which extends close to the top of the oven but does not seal off chamber 139 from 138 allowing sufficient space to permit some of the hot gases to pass from chamber 138 to chamber 139. Conventional dampers (not shown) in the oven outlets may be used to regulate the amount of gases passing into chamber 139 and thus control the degree of heat in the bun chamber. If only warmth is desired for the buns instead of toasting heat, the separator 137 may be a sealed partition and may comprise a more effective heat barrier material than metal.

As the broiled patty 117 leaves the oven, it is stripped off the conveyor 121 by the shoulders 127 of the pulley 128 as thet individual bands 122, 123 and 124, which comprise the conveyor pass through the grooves of pulley 128, and is deposited on a chute-like channel passage 145 which converges toward the bun conveyor 98. The conveyor bands 122, 123 and 124, from which the cooked patty has been removed, pass around pulley 128 and at a suitable point in the return path, these bands pass over a scraper blade 134 supported on brackets 131 which removes adhering food particles (see FIG. 12). Guide rolls 132 which are also supported by brackets 131 assure that the bands remain in proper alignment.

Appropriate removal of the cooked patty in an integral condition from the bands is a delicate operation. In accordance with the invention, this is effected by a combined operation of lifting, doctoring and pushing. The lifting is effected as the bands 122, 123 and 124 run into the grooves of the pulley 128 and the patty is lifted by the shoulders 127 of the pulley between as well as at either side of the bands 122, 123 and 124. While being so lifted, the patty 117 is at the same time and at the same linear speed doctored by a suitable arrangement comprising a plurality of finger-like doctor blades 151, 152 and 153, one of each of which rests on each of the bands 122, 123 and 124 of conveyor 121. The doctor blades 151, 152 and 153 are positioned so as to form a connected uninterrupted passage to the channel 145.

The doctor blades are suitably supported on a bar 154 removably attached at 155 to the machine frame 40 so as to permit detaching for cleaning. As the patty 117 is detached from the conveyor 121 and deposited at the head of channel 145 proximate to the doctor blades 151, 152 and 153, pushers 148 attached to chain 147, which runs over sprockets 144 and 146 and is driven in synchronism with the patty bands 122, 123 and 124 and pulley 128, continue the movement of patty 117 to the assembly area. The timing of chain 147 is arranged such that pushers 148 are positioned in spaced relationship at the rear of the patty (as shown in FIG. 15) at the juncture of band conveyor 121 and pulley 128. When the patty 117 is completely freed from the bands 122, 123 and 124, the pushers 148 then contact the patty and continue its movement over the doctor blades through channel 145. As seen, channel 145 is at an angle with the center line of the machine with the pusher chain 147 mounted above it and in substantially parallel relationship therewith. In the manner thus described, both the patty 117 and bun 69 are thereby delivered to the assembly area. At the assembly area, the patty 117 transported by pushers 148 is deposited at station 158 comprising a slight step down at 159. This recess facilitates proper alignment for subsequent pick-up by the assembly mechanism which is hereinafter described in detail. The bun is likewise delivered to the assembly area as shown in FIG. 16 and deposited on a transfer station 161 at a slightly lower level than that of conveyor 98 and at a location accessible for pick-up by the assembly mechanism.

*Assembly*

The patty 117 now positioned on transfer station 158 and the bun slice now on station 161 are picked up by a rotatable bifurcated arrangement or assembly mechanism 165 comprising a rotating assembly deck 166 on which a sliced bun and patty are borne after pick-up, a sliced bun sweep or wiper 167 and a hamburger wiper 168. As assembly mechanism 165 passes the bun transfer station 161, the bun wiper 167 transfers bun slice 69C onto rotating deck 166. At substantially the same time, but immediately following, the wiper 168 transfers the patty 117 from patty transfer station 158 onto the bun slice. The assembly mechanism 165 which carries pushers 167 and 168 (see FIG. 18) together with the deck 166 carrying the hamburger on the bun slice continues rotation until the deck 166 is over the assembly aperture 171 where the superimposed pair, i.e. the patty on the bun slice, are swept into the aperture by a stationary wiper 172. The rotating assembly deck 166 continues rotation and in a similar fashion picks the middle bun slice 69B which has now been transferred from conveyor 98 to station 161 and a second patty now positioned at station 158 and deposits the pair over the aperture in a like manner. In a third revolution of assembly deck 166, the top bun slice 69A is carried around and deposited on the stack. It will be apparent that on the third revolution only a bun is picked up and this is due to the timing arrangement of conveyors 98 and 121 which advance the bun conveyor 98 three spaces during the interval in which the patty conveyor 121 is timed to advance two spaces.

In the sandwich assembly wherein cheese, lettuce and sauce are included, these items are introduced into the assembly aperture in proper sequence in a manner hereinafter described and in sequence in the order of bun slice and patty, cheese, bun slice and patty, lettuce and sauce and top bun slice.

*Bag forming*

Prior to the time the bottom bun slice 69C and patty 117 are deposited in aperture 171, a wrapper feed hereafter described feeds a sheet of wrapper 181 across the aperture 171. The sheet 181 is positioned so as to be essentially centered across the opening 171 in order that the edges thereof may be formed around the sandwich to form a sack-like container. As the bottom bun slice and patty are deposited, they may be momentarily supported by the wrapper sheet 181 which is pulled across opening 171 while a previous sandwich already wrapped vertically below may be in the process of ejection. As the assembly mechanism 165 rotates to deliver the second unit to this assembly point 171, a vacuum is applied peripherally in the opening 171 and underneath the wrapper. The vacuum pulls the wrapper down in the form of a substantially cylindrical cup 183 as it follows the contour of a telescoping structural arrangement hereinafter described. After deposit of the second unit, the cup is pneumatically lowered increasing the depth of the recess to further accommodate additional items, i.e. a top bun slice, lettuce, etc., which may be stacked in forming the sandwich.

Upon completion of the stacking of the items, the depth of the recess is increased so that the top bun slice 69A lies below the wrapper crimping level 184 seen best in FIG. 18. After crimping or closing of the edges of the wrap 181 around the sandwich to form a bag enclosing the sandwich, the vacuum is removed; the cup is further lowered to allow the wrapped sandwich to clear the lip of telescoping cup 183 and the wrapped sandwich is ejected onto an output conveyor 187. The sequence of the bag forming operation is described more fully hereinafter in connection with FIG. 25 showing wrapping of the doubleburger in a series of sequential illustrations. The wrapped sandwich 188 ejected from the bag forming cup 183 is deposited on an output conveyor 187 shown in part in FIG. 25 and more fully in FIG. 27 in connection with which the further disposition of the sandwich will now be described.

As seen on the output conveyor, the sandwich may be diverted into any one of three channels depending on the type of sandwich programmed into the machine. For this purpose, a selective diverter mechanism 191 through deflecting arm 192 controls deflection of the sandwich into one of three channels, 193, 194 or 195 depending on the type of sandwich involved. When the diverter arm 192 is at position 192A, which is the normal position held thereby spring tension, it is set to deliver a doubleburger into delivery channel 193. When one of the solenoids 196 (see FIG. 28) is energized, it moves the arm 192 through a chain connection 198 and lever arm 199 (see FIG. 29) to position 192B, diverting the sandwich into lane 194. When in this position, the machine has programmed a cheeseburger. In the second alternate, when solenoid 197 is energized, it moves the arm 192 to position shown at 192C in FIG. 27 by means of a chain 200 and lever arrangement similar to 198 and 199, respectively, connected to solenoid 196 but arranged to pivot the arm 192 a different increment to position 192C. When the machine delivers a plain hamburger, it is programmed into the third channel 195.

Reference is now made to FIG. 19 to show the structural arrangement and operation of bifurcated arm unit of assembly 165. The bifurcated assembly mechanism arm comprises a lower portion 167 which sweeps the bun slice and an upper portion 168 which sweeps the patty from their respective stations at the end of conveyor 98 and channel 145, respectively, and which deposits them in superimposed relationship on assembly deck 166. Movement of the assembly arms 167 and 168 as a unit is through parallel links 169 and 170 each of which is pivotable at each end at 177 and 178 and at 179 and 180, respectively. A driving link 173 is pivoted at one end intermediate the ends of link 170 and at the other end link 173 is pivoted at 174, a fixed point.

In motion, the assembly mechanism 165 rotates about its center of rotation 175 which is fixed to the machine frame; the link 170 oscillates relative to deck 166 under the influence of driving link 173. In the area in which the bun and patty wipers or pick-up arms 167 and 168, respectively, sweep the bun and patty onto deck 166, the arms 167 and 168 as a unit are extended towards the end of deck 166 which is more remote from the center of rotation 175. As the deck 166 rotates, the bifurcated unit comprising arms 167 and 168, through action of the parallel linkage, is moved so that the wipers 167 and 168 are withdrawn towards the center of rotation 175 of the deck. This allows a fixed wiper 172 affixed adjacent the assembly aperture 171 to sweep the bun and patty off the trailing edge of deck 166 and into aperture 171 without interference with moving wiper arms 167 and 168. The pick-up in one sweep of both meat patty and bun slice to form a sub-assembly of the patty on the bun slice in accordance with the hereinabove described arrangement of the invention has at least two inportant effects. First, the meat patty juices evolved in the cooking process are deposited right into the bun slice rather than dripping or being distributed on the machine as the patty is transferred for assembly, thus creating a cleaning problem. Second, the sub-assembling of the meat patty on the bun slice substantially minimizes the make-up time for each sandwich comparative to an operation in which a patty and bun slice are delivered individually to assembly thereby significantly increasing the output of the machine.

*Cheese and lettuce dispensers*

The cheese and lettuce dispensing mechanism and operation will be described with particular reference to FIG. 17 and FIGS. 20–22 of the drawings. As seen, preshredded lettuce 202 is contained in a vessel 201 which is mounted on a turntable 203. Turntable 203 is rotatably mounted on a shaft 204 which passes through the base of refrigerated cabinet 205. Shaft 204 is intermittently driven through a ratchet arrangement by an air cylinder 206 connected to frame 40 at 210. Rotation of the vessel is desired to distribute the lettuce pick-up at an even level around the vessel. The piston of air cylinder 206 is connected to a lever arm 208 upon which is mounted a pawl 207 which drives a ratchet 209. The ratchet 209 is affixed to shaft 204. A friction brake 212 prevents the shaft 204 from moving except when positively driven by cylinder mechanism. As a further aid in maintaining a uniform level of shredded lettuce in vessel 201 uniformly, a sweep 213 (FIG. 20) is arranged to rest on the surface of lettuce 202 to substantially level out unevenness occurring as the lettuce is dispensed. The sweep 213 is mounted on the cabinet top at 214 and is restricted to vertical movement.

Mounted on shaft 204 and free to rotate thereon at 216 by means of bracket 217 is a cheese loaf container 218. Preferably, two cheese containers are utilized to enable one to be refilled while the other is in operation thereby obviating production stoppage although it is apparent that one or more than two may alternately be used instead. Container 218 is preferably constructed so as to accommodate a standard five pound loaf of cheese. Mounted adjacent to cheese container 218 is a cheese loaf feed screw 219 and mounted thereon for vertical movement through the action of screw 219 is a loaf supporting platform 220 part of which extends out of the container 218 through slot 221. At the base of the screw 219 is a one-way clutch 224, the housing of which is driven by a lever arm 225. Contacting the lever 225 is a vertically disposed stud 226 mounted in fixed relationship on a lever 227. The lever 227 is pivoted on shaft 228 which is attached to refrigerator cabinet 205. To lift the cheese loaf, an air cylinder 231 acting through arm 227 and stud 226 rotates one-way clutch 224 part of a revolution sufficient to index the loaf up the distance approximating the thickness of one slice of cheese. When the cylinder 231 returns to its at-rest position, arm 225 under the influence of a spring (not shown) returns to its at-rest position ready for a subsequent indexing. The return movement of arm 225 does not rotate screw 219 due to the action of the one-way clutch.

A cheese cutter 233 with cutting wire 234 is fixed to a shaft 235 which conveniently is mounted concentrically within screw 219 and is rotatable therein. At the lower end of shaft 235 and fixed thereto is a lever 236 which is contacted for rotatable movement by a stud 237 in a manner similar to the drive for lever arm 225 described hereinabove. To actuate the cheese cutter, cylinder 239 is employed. The piston rod 240 of cylinder 239 is employed to drive stud 237 for a sufficient distance to enable the cheese slicing wire 234 to make a full cut transversely across the vertically disposed cheese loaf. After the slice of cheese has been picked up by a pick-up head 245 in a manner hereinafter described, the cylinder 239 returns, followed by a return movement of the arm 236 under the influence of a spring (not shown). A limit switch 242 is arranged so that if the cutter arm 233 does not return the cheese loaf is prevented from being further lifted and possibly damaging the mechanism. To prevent the cheese loaf from lifting or being otherwise displaced, particularly when the loaf is substantially used up, a U-shaped pin 222 is employed. The top leg of the pin 222 is inserted into the cheese loaf while the bottom leg is inserted in an aperture formed in the loaf support platform 220.

The sliced cheese is delivered to the assembly area by a pneumatically actuated pick-up device 245 equipped with pins 246 which pierce the slice of cheese as it is picked up. The pick-up head 245 comprises three main elements. The first is a perforated pin retaining plate 247 having an upstanding cylindrical portion 248 at the top of which is a collar 249. A second plate 258 is removably secured to retain pins in plate 247. The second element is a stripper plate 250 also equipped with a cylindrical portion 251 and also contains a collar 252. The cylindrical portion 251 of the stripper plate 250 is concentrically disposed and slidably mounted within the cylindrical portion 248 of the pin retaining plate 247. A helical spring 253 is fitted over the cylindrical portion 251 of the stripper plate between collar 252 of the stripper plate and collar 249 of the pin retaining plate urging the two apart thereby keeping pins 246 projecting from the stripper plate 250. The third main element of pick-up head 245 is a knockout plate 255 having an upstanding shaft 256 centrally disposed and slidably mounted in cylinders 251 and 248. The shaft 256 is also fitted with a collar 257. A helical spring 254 is fitted over shaft 256 between collar 256 of the stripper plate and collar 257 of the knockout plate 255 thus urging the two elements apart so that the knockout plate is retained, as shown, in its withdrawn position. The upper end of shaft 256 is removably attached to the piston rod 261 of an air cylinder 262. Air cylinder 262 is secured at 263 to transfer arm 264 which is arranged to pivot horizontally on a stud 265; stud 265 being secured to the machine frame 40.

In operation, when a slice of cheese is programmed for inclusion in the sandwich, the cylinder 262 drives the cheese pick-up head 245 downward piercing the slice of cheese with extended pins 246. The head 245 with the cheese impaled thereon is withdrawn. Transfer arm 264 by means of a pneumatic cylinder 293 discussed further hereinafter is swung so that the cheese head is positioned vertically above the assembly aperture 171. As arm 264 is swung horizontally, the cylindrical portion 248 of pin retaining plate 247 enters an arcuate slot 267 in bolster plate 268. The slot 267 has a transverse dimension less than collar 249 so that collar 249 is retained as head 245 moves down.

The cheese slide is preferably deposited after the bottom bun and patty have been deposited in the assembly aperture 171 but prior to delivery of the second bun slice. In depositing the cheese, the air cylinder 262 is again energized as the head 245 is over assembly aperture 171. When this occurs, it drives the head 145 downward with the collar 249 being restrained by bolster plate 268. As the arm 245 continues downward against the force of the springs, the stripper plate 250 strips over the pins 246 which hold the cheese slice. The continued downward movement in sequence and against the second spring having a greater resistance pushes knockout plate 255 out beyond the surface of the stripper plate 250, thus assuring that the cheese slice is disengaged and falls on the meat patty 117 in the assembly aperture 171. Spring 254 in the head unit 245 is selected so as to require a suitably greater compressive force than spring 253 to provide the appropriate sequence.

The lettuce pick-up head 271 is generally of similar configuration as the cheese pick-up head 245 with the exception that the knockout plate is omitted and a sauce dispenser is introduced. As shown in FIG. 22 of the drawing unit 271 comprises a perforated pin retaining plate 272 having an upstanding cylindrical portion 275 at the top of which is formed a collar 276. A perforated stripper plate 277 through which pins 273 pass is mounted on a tubular shaft 278 concentrically disposed within cylindrical portion 275 and also containing a collar 279 formed at the top thereof. A helical spring 281 is fitted over the shaft 278 of the stripper plate 277 between collar 276 of the pin retaining plates 272 and collar 279 of the stripper plate, thus keeping the pins 273 projecting through stripper plate 277. The upper end of shaft 278 is removably attached to a piston rod 283 of a cylinder 284. The air cylinder 284 is secured at 285 to the transfer arm 264. A sauce conduit 286 is arranged to enter the interior of shaft 278 connecting at the top to inlet tube 286 which is in turn connected to flexible tubing 287 leading to a sauce pump.

When a portion of lettuce is programmed for inclusion into the sandwich, the air cylinder 284 drives lettuce pick-up head 271 downward permitting pins 273 to impale a quantity of shredded lettuce 202. The head 271 is then withdrawn retaining a portion of lettuce on the pins 273. Thereafter, transfer arm 264 is swung so that the head 271 is positioned vertically over assembly aperture 171. The cylindrical portion 275 of head 271 enters the arcuate slot 267 and functions to release the lettuce in a manner similar to the cheese dispenser through the action of air cylinder 284 upon retention of collar 276 on the slot 267 of the bolster 268. Substantially at the same time that the lettuce is dispensed from pins 273 by stripper plate 277, a portion of sauce may be deposited through the center of the head 271 through openings in plates 272, 274 and 277. The dispensing of lettuce and sauce is preferably effected after the second bun slice 69B and second superimposed meat patty have been deposited on the partially assembled sandwich and prior to the addition of the top bun slice.

A sauce pump 287 of commercially available construction[1] driven by air cylinder 288 secured to frame 40 through a pivoted lever 289 is also secured to frame 40. A sauce container 290 is connected by suitable conduit 291 to pump 287. In pumping sauce in response to demand, an air cylinder 288 causes lever 289 to pivot about point 300. This in turn oscillates pump piston and delivers a metered quantity of sauce through flexible tubing 292 to the head 271 now positioned over aperture 171 for deposit on the sandwich.

The transfer arm 264 is swung into appropriate position by means of air cylinders 293 and 294. The end 296 of rod 295 is pivotally secured to the arm 264. The air cylinder 293 is pivotally secured intermediate the ends of a lever arm 297. One end of arm 297 is pivotally attached at 298 to the machine frame 40; the other end of arm 297 is attached to the piston rod 299 of cylinder 294. The other end of cylinder 294 is pivotally attached at 301 to the machine frame 40. Motion of arm 264 from its position over the cheese and lettuce refrigerator cabinet 205 to deliver these items over the assembly aperture 171 is initiated when the rod 295 of pneumatic cylinder 293 is withdrawn. The stroke of this cylinder rod is proportioned so that at the end of the stroke the cheese pick-up head 245 is positioned vertically over the assembly aperture 171. After the cheese has been dispensed in the manner hereinabove described, the rod 299 of cylinder 294 is then extended. This moves the lever 297 which through cylinder 293 in turn moves arm 264 an additional increment beyond that movement effected through cylinder 293 such that the lettuce head 271 is now vertically positioned over the aperture 171. After the lettuce and sauce are dispensed from 271, the piston rod in 299 of the cylinder 294 is retracted and at substantially the same time, rod 295 is extended from cylinder 293. This return movement of rods 295 and 299 brings transfer arm 264 into its original position over the cheese and lettuce containers in the refrigerator cabinet 205 and upon suitable impulse enables a subsequent portion of cheese and lettuce to be picked up by the respective heads 245 and 271.

*Bag forming*

Wrapping of the sandwiches is effected as follows: A sheet of wrapper 305 preferably of relatively thin, pliable, tear resistant composition is fed from a roll 304 around a plurality of rollers including a dancer roller 306 and stationary rollers 307 and 308 (see FIG. 1). The dancer roll 306 aided by counterweight 309 keeps a substantially constant tension on the web 305. The wrapper mounting arrangement comprising rollers 306–308 is of conventional configuration and such that when the loop 310 of wrap is reduced a predetermined amount due to the action of the wrapper feed which is described hereinafter in connection with FIG. 23, a roll drive motor ---
[1] A suitable device is available as Model FDS–60 from National Instrument Co., Baltimore, Maryland.

(referred to as 520 in FIG. 32) is energized by limit switch 519 and feeds out the web from roll 304 to increase the loop the desired amount.

The wrapper feed unit 312 comprises a pair of parallel chains or belts 313 and 314 which are driven in synchronism by a suitable motor 315. Secured to the belts 313 and 314 there are at least two wrapper feeding U-shaped elements 316 provided with teeth which pierce the wrap 181 and draw it, through the action of moving conveyors 313 and 314, across assembly aperture 171. To assure that the wrap 181 is pierced and retained on teeth 316, a fixed guide 317 is positioned between each pair of teeth 316 as illustrated in greater detail in FIG. 24B. When a sheet of wrap is programmed, motor 315 is started and chains 313 and 314 driven until one set of teeth 316 in contacts the actuator 319 of limit switch 318 which in turn stops motor 315. A brake may be fitted to assist prompt stoppage of web feed when a suitable length of wrap to form sheet 181 has been fed. As shown, two sets of teeth 316 are engaged in the wrapper web 305. These teeth are suitably spaced along the web at a distance to provide the desired length of sheet 181. Sheet 181 is now severed from web 305 by a knife 320 suitably supported at 321 and arranged to traverse across the web 305 by means of air cylinder 322.

After the piece of wrap 181 from which the bag is to be formed is cut from web 305, the teeth 316 are disengaged from the wrap by a solenoid-operated pivotable hammer-like element 311 which through cross piece 323 and lug 324 depresses the conveyor 313 and 314 thereby disengaging teeth 316 from contact with the sheet 181.

The mechanism used to form the wrapping sheet into a bag comprises four main cylindrical elements 325, 326, 327 and 328, generally in telescoping relationship. The top element 325 comprises a flange forming a cup-like lip 183'. Projecting from the inner side of element 183' are a plurality of projections 329 for the purpose of supporting a plate 330 in fixed relationship in the opening of section 325. Plate 330 is peripherally spaced from the edge of cup 183 allowing air to pass around the periphery. A seal 331 is fitted around the upper edge of cup 183' to prevent leakage of air (when vacuum is applied) between it and the ring 332. Ring 332 is attached to the wrapper feed and defines assembly aperture 171. A central tube 333 through which vacuum is applied is attached to the telescoping section 325. Section 325 is further provided at its bottom with an inturned annular flange 334.

Disposed within section 325 is cylindrical section 326 provided at its top and bottom with outward projecting annular flanges 335 and 336, respectively. Concentrically positioned over section 326 is section 327 provided, intermediate its ends, with an inwardly projecting annular flange 337; at its lower end with outwardly projecting annular flange 338; and at its upper part with cylindrical extension 339. Section 328 has an inwardly projecting annular flange 340 on which extension 339 bears during telescoping movement.

Annular air chambers 342, 343 and 344 are formed between flanges 334-335, flanges 336-337 and flanges 338-340, respectively. Suitable seals are provided to prevent escapage of air introduced into these chambers to actuate movement of these cooperating elements. A plurality of air cylinders 346 which are attached to frame 40, only one of which is shown, functioning through piston rod 347 hold the telescoping sections in the extended position.

Formation of the bag from the sheet 181 is effected as follows: In the first stage pneumatic cylinders 346 are actuated to hold the seal 331 against the flange 332 and vacuum is applied through tube 333. The vacuum acting peripherally around plate 330 draws the wrapper 181 into cup 183' forming a relatively shallow recess where it is held securely.

In the second stage, pressure in cylinders 346 is relieved at least to the extent suitable to permit telescoping section 325 to move downward relative to telescoping section 326 under the influence of air pressure introduced into annular chamber 342. The relative motion between sections 325 and 326 is limited when the top of flange 335 contacts the underside of an annular flange 348 formed on the innerside of section 325. At this point, the bag forming recess is deepened by the amount of movement of section 325 relative to section 326.

In the third stage, air is introduced into annular chamber 344 effecting downward movement of section 327 which carries with it sections 326 and 325. Movement of section 327 is limited when annular flange 338 contacts the inwardly projecting flange 349 which is an integral part of section 328. The bag forming recess is now further deepened by the amount of downward movement of section 327. At this point, the bag is still retained in cup 183' by the vacuum applied peripherally around plate 330; and the greater part of sheet 181 has been drawn through the aperture in ring 332 in the form of a substantially cylindrical bag. Before there is any further relative movement in the telescoping sections 325, 326, 327 and 328, the top of the bag is closed at level 184 in a manner hereinafter described by reference to FIG. 26.

In the next or fourth stage, the vacuum at tube 333 is released and pressure is applied at annular chamber 343 effecting downward movement of section 326 which carries with it section 325. Movement of section 326 continues until flange 334 of section 325 contacts flange 337 of section 327. The bag is now held at level 184 by the crimping device (see FIG. 26) while cup 183 moves downward away from the formed bag. This leaves the bag dangling free at the neck awaiting transverse removal from the assembly station as will be described in connection with FIG. 26. After the removal of the bag, pressure is relieved in annular chambers 342, 343 and 344 and cylinders 346 are again actuated to return the telescoping unit to its uppermost position ready for commencement of another cycle.

The bag forming and filling operation is further illustrated by reference to FIG. 25 in which a sequence of steps A to I is depicted describing the operation in wrapping a doubleburger. As shown in sequence A the wrap is substantially flat and the bottom bun slice 69C and patty 117 have been deposited thereon at the assembly aperture 171. At this point the telescoping unit is extended fully to allow a previously formed sandwich to be ejected. In sequence B the cheese is deposited upon the first meat patty 117 and the telescopic unit has risen to its uppermost position. In sequence C the first stage of the bag forming operation is shown, wherein vacuum has been applied peripherally at plate 330. In sequence D, the middle bun slice 69B and the second meat patty are deposited and at substantially the same time, the second stage of bag forming takes place in which the bag in the process of being formed is further deepened. At E the lettuce and sauce are deposited. At F the top bun slice is deposited and the third stage of the bag forming occurs at approximately the same time. This last operation brings the level of the top bun slice below the bag crimping level.

In sequence G the bag is closed by the crimper. In sequence H the vacuum is released and the final drop of the telescoping sections occurs leaving the bag suspended in the crimping jaws. Finally in I the formed bag is transversely ejected from the assembly area, preferably assisted with a jet of air 350 impinging on the bag, and is deposited on the output conveyor. During the same time if a further hamburger is programmed, additional wrap is fed across the aperture and a new sequence is initiated commencing at A. In the event that the hamburger fails to eject properly onto the output conveyor, failure of the sandwich to pass a suitably placed limit switch 517 (FIG. 27) will stop the machine in the position as shown in sequence I.

The sequence of operation in wrapping a cheeseburger is as follows: Referring again to FIG. 25; sequence steps A, B and C are the same. In sequence D, instead of stacking a top patty and second bun slice as in the doubleburger, the top half of the cheeseburger bun is deposited. The position of the telescopic unit in sequences E and F are as shown except that no further items are stacked in the sandwich. The sequences for telescoping sections 325–328 as shown at G, H and I are as shown for the doubleburger in FIG. 25.

For a hamburger, the sequence is the same as that for the cheeseburger, except that no cheese is deposited in sequence B of FIG. 25.

Figure 26:
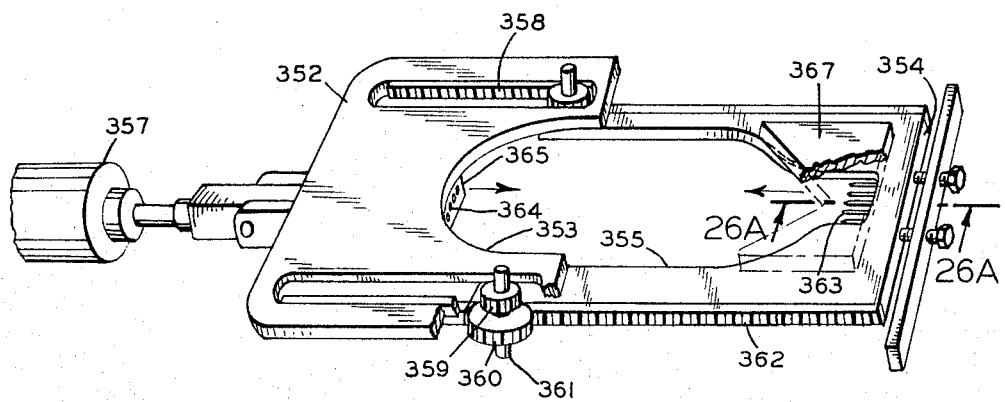
FIG. 26 is a perspective view of the bag closing and ejecting mechanism.

The crimping arrangement illustrated in FIG. 26 comprises an upper plate 352 provided with a concave cut-out recess 353 and a lower plate 354 having a substantially V-shape cutout 355. The plates 352 and 354 are arranged in slidable relationship. The recesses 353 and 355 coact converging and closing the ends of the wrapper to form the bag. A pneumatic cylinder 357 is arranged to move upper plate 352. A pair of racks 358 secured to plate 352 drive a pair of pinion gears 359. Fixed to gears 359 and on a lower level than gears 359 are a second pair of gears 360. Gears 359 and 360 rotate on a common spindle 361 which is secured to machine frame 40. The lower gear 360 drives a rack 362 on the lower plate. Thus, when cylinder 357 is actuated, plates 352 and 354 converge and close the opening formed by recesses in the plate thereby forming a neck in the wrapper.

Figure 26A:
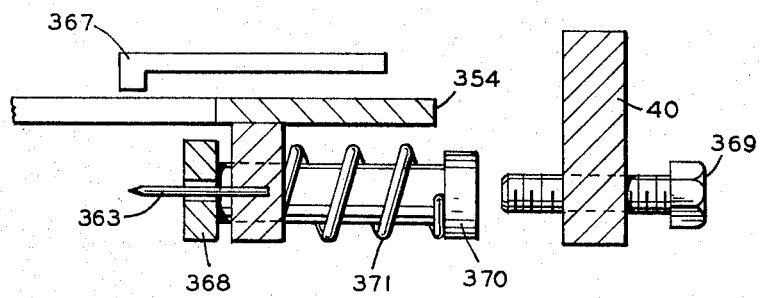
FIG. 26A is a view taken substantially along line 26A—26A of FIG. 26.

As the bag is substantially closed a plurality of pins 363 attached to plate 354 pierce the neck of the bag and penetrate into a plurality of pin mating recesses suitably formed in a plate 365. Plate 365 is attached to the upper plate 352. After the bag neck is crimped, the double acting cylinder 356 is withdrawn and recesses 353 and 355 in plate 352 and 354, respectively, are restored to open position. As the lower plate 354 is withdrawn, the bag which is implated on the pins 363 is carried on the pins clear of the assembly area. Stripping of the bag occurs near the end of the stroke by the combined action of two elements. A deflector 367 assures that the top part of the bag which may be flared somewhat is moved clear of the Y-shaped recess 355. A stripper plate 368 which is fitted over pins 363 and free to slide thereover (as shown more clearly in FIG. 26A) strips off the crimped bag as pins 363 are retracted.

Disengagement is effected when plate 354 approaches the end of the retraction stroke as pin 370 engages a stud 369 secured to the machine frame 40. This action prevents a further movement of the stripper plate 368 while the lower plate 354 and pins 363 continue to retract until the ends of pins 363 are substantially flush with surface of plate 368. The wrapped sandwich is now free to drop on output conveyor 187. Transverse ejection of the released bag may be assisted by an air jet 350 illustrated schematically in FIG. 25I. A helical spring 371 concentrically positioned over pin 370 returns the stripper plate so that the pins project when plate 354 is moved in for the next crimping operation.

*Programming mechanism*

In order to effect the result contemplated for the apparatus of the invention of delivering any type of sandwich at any time and in any sequence, a suitable memory device is employed. A memory device is also important because the time of transit of the elements of the sandwich from inception to completion is considerably greater than the time between subsequent orders and if the intervening time is to be efficiently utilized, it is necessary to program the elements of the machine by a device of this kind to arrange for use of the intervening time. For example, while approximately 80 seconds may be consumed in dispensing, cooking and assembling the items of a sandwich, it is possible for the machine to deliver a sandwich about every six seconds by subsequent impulses in elements in which the previous order has been cleared without waiting for the completion of the sandwich preparation and assembly.

The memory mechanism employed may be any one of various devices known to one skilled in the art. As an example, the remote control timing units available as "Synchro Timer" from Pratt & Whitney Company may be adapted. Alternately, the memory mechanism hereinbelow described may be used.

Figures 30, 31:
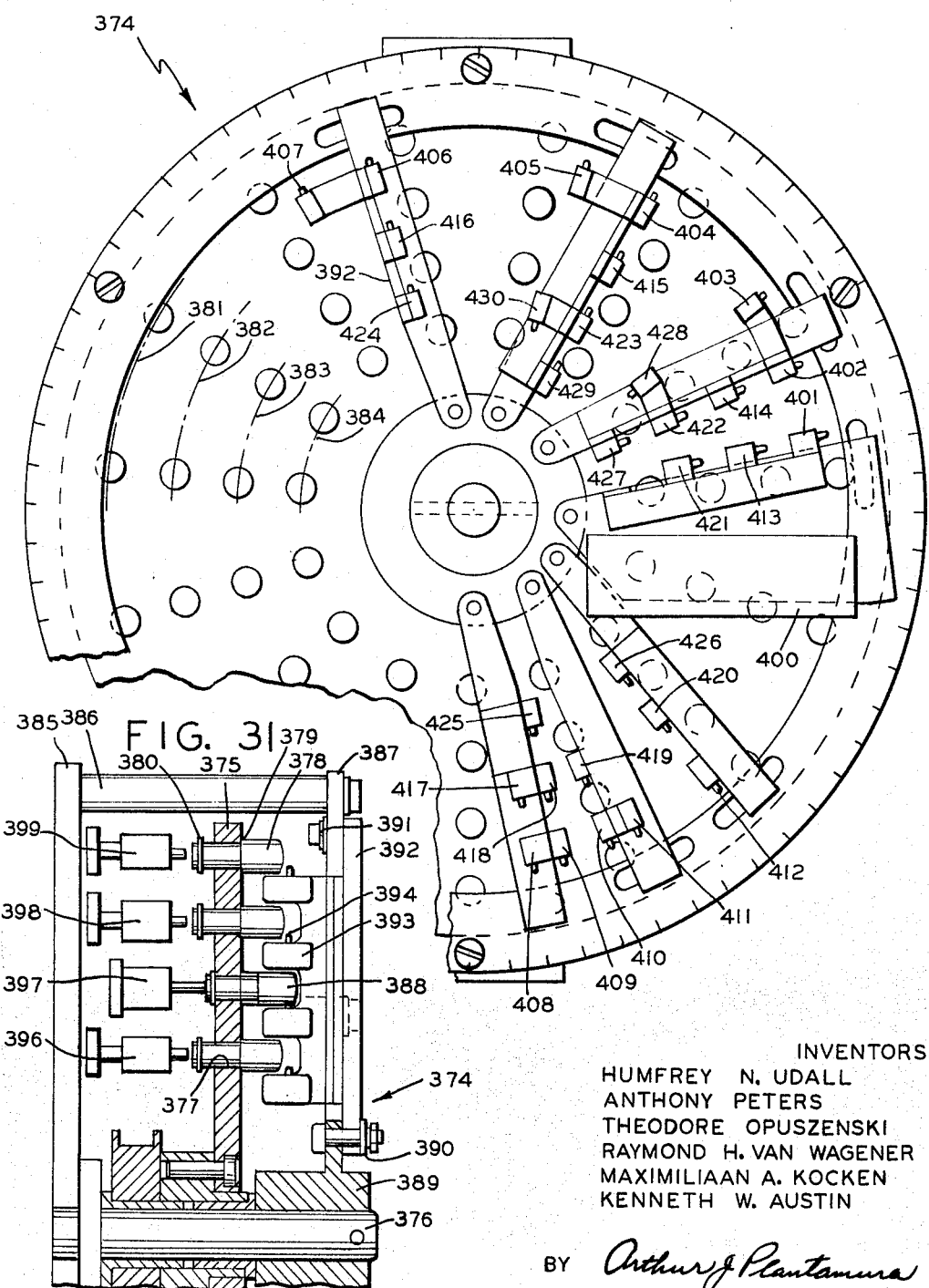
FIG. 30 is a front view of the memory device.
FIG. 31 is a partial side view of the memory device.

As shown, the memory device 374 of FIG. 30 comprises a rotary disk 375 rotating on a shaft 376 and positively driven in timed relationship to the machine by suitable connection as by suitable gearing or timing belts (not shown). Mounted in apertures 377 disposed in four circular tracks on disk 375 and designated as rows 381, 382, 383 and 384, are a plurality of cylindrical axially movable pins 378. Pins 378 are retained in disk 375 by a shoulder 379 at one side and by a snap ring 380 at the other side. Also preferably contained in the pins 378 is a conventional spring loaded detent (not shown) to aid positive functional positioning of the pin in its back and forth movement. Shaft 376 is attached to a back plate or support 385. Spaced from back plate 385 by spacers 386 is a circular ring 387. The back plate 385 is suitably secured to the frame 40 of the machine. A hub 389 is secured to shaft 376. Supported between hub 389 at 390 and ring 387, at 391 are a plurality of switch supporting arms 392. Secured along the arms 392 are a plurality of switches 393 which vary in number for each arm. These switches are of a kind available commercially from various sources such as, for example, those available as Type 16–1041 from Licon Division of Illinois Tool Works.

The switches 393 each have an actuator 394 and are positioned on arms 392 so as to function cooperatively with pins 378. Pins 378 are normally spatially positioned out of the rotational path which would result in engagement with switch actuators 394. Pins 378 are arranged to operably contact the actuators 394 when one of the pins 378 which has previously been moved into extended position (as shown at 388 in FIG. 31) by one of the solenoids 396, 397, 398 and 399, passes the switch during rotation of disk 375. Once the set pins 378 have passed all switches 393 on the arms 392 and prior to passing the solenoids 396, 397, 398 and 399 a second time, an element 400 having an inclined face engages and returns the pins out of the path which would result in the pins engaging switch actuators 394.

In the disk-like memory unit shown, track 381 is used to program doubleburgers. The order is initiated by solenoid 399 which extends the pin in the manner indicated at 388. Signals to the solenoid 396 through 399 may be initiated through a manual switch or alternately by a remote electrical ordering system which may combine this machine with a plurality of other food preparing and dispensing machines to form an automated restaurant. An electrical ordering system of this kind is disclosed in a copending patent application of N. Alpert et al. for "Electronic Ordering, Price Computing and Billing System and Its Application," Serial No. 219,222, filed on August 24, 1962.

The extended pin 378 now passes in sequence over all switches in track 381. The sequence of actuators 394 in track 381 is such that they function to give a proper timed interval to the various elements in the machine controlled by the switches. For example, the first switch 401 may be merely a communication signal to record a sandwich has been ordered. The next two switches 402 and 403 individually initiate the dispensing of the two patties. Switches 404 and 405 are utilized as alternates and function similarly to 402 and 403 in connection with the second patty maker. Switch 406 initiates the dispensing of the sliced bun which comprises three slices while switch 407 actuates the destacker to separate the third slice. It may be noted that the machine separates the bottom slice of every bun whether two slices or three slices in every cycle so it is only in the double-burger having a three-slice bun that the extra impulse to the destacker is required. Switch 408 initiates cheese and lettuce pick-up. Switch 409 initiates the wrapper feed and pulls in a latching relay which opens the assembly station air supply.

The assembly station air supply feeds compressed air to the cam-operated air valves which in turn supply air to operate the telescopic bag forming unit, the wrapper cutting knife, and the bag crimping unit through their appropriate pneumatic cylinders and to operate the eductor which provides the vacuum to the bag forming unit. The latching relay also energizes the tripping system so that if wrapper fails to feed properly, the machine is automatically stopped. Switch 410 initiates deposition of the cheese into the assembly aperture 171 while switch 411 commands the deposit of lettuce and sauce. Switch 412 energizes the tripping system which stops the machine in the event that it fails to properly eject the assembled sandwich onto the output conveyor.

In preparing a cheeseburger, the programming is through track 382 of the rotating element 375. In that track switches 413, 414, 415, 418 and 419 initiate the same functions in the machine as switches 401, 402, 404, 409 and 410, respectively, described above in connection with preparation of a doubleburger on track 381. Additionally, however, track 382 has the differences in that switch 416, in the proper sequence, dispenses a bun comprising two slices; switch 417 initiates picking up of cheese only as distinguished from switch 408 which initiates pick-up of both cheese and lettuce; and switch 420, in addition to setting up the trip system, like switch 412, also furnishes an impulse to the diverter mechanism on the output conveyor to divert the sandwich into the proper channel.

With respect to the dispensing, processing and assembly of a plain hamburger, switches in the path of track 383 on the rotating programming disk 375 are utilized. In that path, switches 421, 422, 423, 424, 425, 426 initiate the same functions in the machine as above referred to switches 401, 402, 404, 416, 409 and 420, respectively, comprising all the functions programmed by the memory system to produce hamburgers.

The innermost track or fourth track 384 is utilized to accommodate the second meat patty maker in the system and to assure that either one or the other of the two patty makers fills the order and further that both patty makers do not fill the same order. Thus switches 402, 414 and 422 are overridden or superseded in command by switch 427 and switch 403 is overridden by switch 428 such that when the pin providing the impulse to the patty maker on track 384 does not actuate switches 427 and 428, the signals from switches 402, 414, 422 and 403 will function to deposit a patty. Alternately, when a pin does actuate 427 and 428, the signals from switches 402, 414, 422 and 403 are overridden so that no patties are deposited by the first patty maker as a consequence of impulses from switches 427 and 428. In a similar manner, switch 429 overrides 404, 415, 423 and 430 overrides 405 such that if the pin on track 384 actuates switches 429 and 430, the signals from switches 404, 415, 423 and 405 will deposit patties. If the pin does not actuate 429 and 430, the signals from 404, 415, 423 and 405 are overridden and no patties are deposited by the second patty maker.

It is thus seen that if the pin on track 384 is not actuated by solenoid 396, the first patty maker will fill the order whereas if it is actuated the second patty maker will fill the order. In either case, to prevent duplication, the alternate patty maker is rendered inoperative when the other fills the order.

*Circuit*

Operation of the various elements of the apparatus of the invention as they are controlled by suitable electrical interconnections will be described in conjunction with the circuit diagram of FIG. 32 in which, where applicable, similar reference characters are employed in describing similar components. A suitable source of three phase power represented by lines L1, L2 and L3 is provided together with a neutral lead L4 which gives a single phase supply at a lower voltage. Start up of the machine is initiated by button 440 which turns on a blower 443 through a standard magnetic starter 442. Blower 443 provides the air supply for the gas fired furnace. One lead from the magnetic starter 442 simultaneously energizes relay 444. Through contacts 445 and 446, relay 444 energizes the main drive motor 447, the output conveyor motor 448 and a transformer 449. The main drive motor 447, through suitable chains, gears, and/or timing belts, drives the rotary assembly mechanism 165 (FIG. 19), the memory unit 374 (FIG. 30) and the cam shaft for the cam operated switches. The transformer 449 provides a low voltage to both the wrapper sensing device relay 450 and to a holding coil 451 for push button contacts 452. Button 452 energizes the main gas supply valve 453; the holding coil 451 provides a safety measure to assure that the gas is turned off in the event of a power failure and further that the gas will not come on again when power is restored until the manual button 452 is again depressed.

A temperature controller of conventional type is provided to maintain the appropriate temperature in the oven. For this purpose, a temperature sensitive element which closes contacts 454 when the minimum operating temperature has been reached may be conveniently incorporated into the controller. The circuit diagram will now be discussed in conjunction with the preparation by the machine of a doubleburger.

It will be understood that the machine will be suitably installed so that terminal 455 is connected to L4 by an exterior ordering means such as that disclosed in the hereinbefore referred to application of N. Alpert et al. When the machine of the invention is used in conjunction with an automatic ordering system of that kind, a timed cam operated switch 471 closes to signal the automatic ordering system that the machine is at the correct part of the cycle to accept an order.

When it is desired to order a sandwich, a pulse from the cam operated switch 456 energizes solenoid 399 which extends one of the memory pins 378 described in FIG. 30. Also, as discussed in connection with FIG. 30, either switch 402 and 403 or switches 404 and 405, for the alternate meat patty molder, provide pulses to solenoid valve 457 or 458, respectively, to initiate the demand for two meat patties. A pulse from switch 406 next operates solenoid valve 459 to dispense a three slice bun. A cam operated switch 460 provides a pulse to energize the destacker solenoid 103 (FIGS. 6 and 9) also referred to as 461 in the circuit diagram of FIG. 32 for a sufficient time to allow the bottom slice 69C of the bun to be separated from the remaining two stacked slices. Switch 407 keeps the solenoid energized for an additional time to allow the middle slice to be separated from the top slice. Switch 408 then provides a pulse to relay 462 closing contacts 463 and 464. Contact 463 in turn operates solenoid valve 465 which provides the impulse for the air cylinder 284 to pick up a portion of lettuce. Simultaneously the contact 464 closes to allow the cam operated switch 466 to provide a pulse for solenoid valve 467 which in turn operates the air cylinder 262 to pick up a portion of cheese. Switch 409 has two sets of contacts. The first set 409A closes to allow cam operated timer switch 468 to provide a pulse to relay 469 and to the latching coil 474 of a latching relay 478. The contacts for relay 469 and 470 and 471. Contact 471 energizes wrapper feed motor 315 and contact 471 holds relay 469 closed until limit switch 318 opens thereby opening the relay 469 and stopping wrapper feed motor 315.

Switch 318 is positioned on the wrapper feed to open after the appropriate length of wrapper has been fed. When the loop of the wrapper around the dancer roll shortens to a predetermined point, limit switch 419 closes and starts a wrapper roll motor 520 which drives the roll of wrapping material 30 and thus lengthens the wrapper loop until movement of the dancer arm opens the switch 519 and stops motor 520.

Contacts for latching relay 478 are 475 and 476. When contact 475 closes this allows a pulse from cam operated switch 479 to close relay 480. A contact 481 of relay 480 closes and energizes solenoid valve 482 which supplies air to the various mechanisms which accept the product into the bag and form, close and eject the bag. Relay 480 is held closed through its contact 481 and contact 483 of the wrapper sensing relay 450.

At a point in the machine cycle when the bag wrapper, if programmed, should have been fed, solenoid 485 is energized through cam operated timer 486. Solenoid 485 actuates both the hammer-like release elements 311 of the wrapper feed to release the wrap and secondly, the insulated sensing contact 484. If the wrapper sheet is correctly positioned in the wrapper feed, contact 484 will strike the wrapper sheet and no contact to the ground connection, indicated as 487, will be made. If, on the other hand, no sheet is programmed or a programmed sheet fails to feed, the contact 484 will be made to ground connection 487 and the wrapper sensor relay 450 will be energized. When relay 450 is energized, contact 483 will open thereby de-energizing relay 480, opening its contact 481 and hence closing the valve 482 to cut off the air supply to the sandwich assembly area. When relay 450 is energized, its normally closed contact 488 will open. If a wrapper sheet is not programmed, the contact 476 of the latching relay 478 will be closed. However, if a sheet is programmed, contact 476 will be open and since contact 488 is also open, the magnetic starter 442 will open thereby stopping motor 443. In addition, through relay 444 and associated contact 445 and 446, motors 447 and 448 are stopped and the power supply to transformer 449 is turned off. Power cut-off to transformer 449 in turn de-energizes holding coil 451 and allows push button contacts 452 to open thus closing the gas supply valve 453. It is thus seen that when a wrapper sheet is not programmed, the assembly air supply will be turned off. However, if a sheet is programmed but fails to feed properly the whole machine will be shut down.

A second set of contacts of switch 409, designated 409B open simultaneously with the closing of the first set of contacts 409A hereinbefore referred to. Opening of contacts 409B de-energizes relay 489 and thereupon contacts 490 on relay 489 also open. Relay 489 remains open until it is subsequently energized in the machine cycle by the cam operated timer switch 491. Another set of contacts 492 on relay 489 closes when relay 489 is de-energized thereupon energizing solenoid valve 493 which supplies air to both the cylinder 293 which positions the cheese dispensing head 245 over the assembly aperture 171 and also to the cylinder 206 which through a ratchet drive indexes the lettuce container support. Memory switch 410 is now pulsed and allows cam operated timer switch 494 to energize solenoid valve 467 thereby dispensing the cheese in assembly aperture 171 by proper impulse to air cylinder 262. After deposition of the cheese, cam operated timer switch 495 operates solenoid valve 496 which in turn actuates cylinder 294 to position the lettuce dispensing head over assembly aperture 171. Memory switch 411 now closes relay 497.

Relay 497 has two sets of contacts 498 and 499: contact 498 energizes solenoid valve 465 which effects the dispensing of the lettuce through air cylinder 284. Simultaneously, contact 499 of relay 497 allows cam operated timer switch 500 to pulse solenoid valve 502 which in turn operates the sauce pump air cylinder 288. Normally closed contacts 501 of relay 489 will be closed at this point since relay 489 is de-energized. During the time that relay 489 is de-energized and the cheese and lettuce are being dispensed into the assembly aperture 171, cam operated timer switch 503 closes thereby energizing solenoid valve 504. As a consequence, the cheese cutting arm 233 through its associated air cylinder moves the cheese cutting arm into position ready to cut the subsequent slice of cheese. At the end of its travel, the cutting arm lever 236 actuates limit switch 242. Cam operated timer switch 506 then closes and provides a pulse to energize solenoid valve 507 through the switch 242. Solenoid valve 507 actuates the air cylinder which lifts the cheese block to a level prearranged to give the desired slice thickness.

If for any reason the cheese cutting arm 233 does not complete its full stroke, switch 242 will remain open preventing lifting of the cheese block to prevent damage to the mechanism. After switch 506 opens and the cheese loaf lifting cylinder returns, switch 503 opens and the cheese cutting arm 233 cuts a cheese slice in readiness for the next pick up. After dispensing of cheese and lettuce have been complete, switch 491 closes thereby energizing relay 489 which closes its holding contact 490. This also opens contacts 492 which de-energize valves 493 and 496 which operate air cylinders 293 and 294, respectively, so returning the cheese and lettuce dispensing heads and the arm 264 to their pick-up position. Substantially, at the same time, the timer switch 495 opens in readiness for the subsequent cycle.

The cheese dispensing mechanism comprises two cheese loaf containers which are positionable between three stations; a dispensing station, a standby station and a refill station. Before the standby cheese container replaces the dispensing container three conditions must coincide. Firstly, the container in the dispensing station must be substantially exhausted; this closes limit switch 508. Secondly, the cheese and lettuce transfer arm 264 must be in its pick-up position; this closes limit switch 509. Thirdly, a container must be in the standby position; when a container is in the standby position, the limit switch 510 is positioned as shown in the circuit diagram. When these three conditions are satisfied, solenoids 511 and 512 are energized. Solenoids 511 and 512 move the cheese container carrier locking pins 215 up out of engagement with the frame and into engagement with the lettuce container support 203 so that in the next rotating increment of the lettuce support 203, the detached cheese containers also rotate and the standby cheese container is now located in the dispensing position. At this point, the locking pin 215 drops back into engagement with the frame because the empty cheese container has moved away from limit switch 508. Switch 508 is thus opened de-energizing solenoids 511 and 512.

After further increments of rotation of the lettuce container support, the now detached empty cheese container arrives at the loading station, its locking pin 215 drops into engagement with the frame and actuates switch 510 into the position opposite from that shown in the circuit diagram. If this container remains in the refill position when the other container is substantially empty, the closing of switches 510 and 509, through switch 510, will hold relay 489 closed. Because relay 489 is thus held closed, the cheese and lettuce transfer arm cannot move even though a demand for cheese is made by the memory. The cheese and lettuce dispensing unit thus held immobile until the cheese container in the refill station is loaded and manually shifted into the standby position through the operation of manual switch 513. Switch 513 operates solenoid 514 to move the locking pin of the container carrier. The arrangement is now in a position permitting subsequent manual movement of the container into standby position.

A switch 535 is provided to enable the sauce pump to be manually operated for cleaning and priming. Switch 535 operates motor 536 which pulses contacts 537 to operate the sauce pump solenoid valve 502 independent of the automatic circuits.

After the bag containing the finished sandwich has been closed by the bag crimper, the timer switch 515 pulses solenoid valve 516 which supplies the air blast (illustrated in FIG. 25) to aid ejection of the sandwich onto the output conveyor. At substantially the same time as the sandwich is being deposited onto the conveyor, the normally closed contacts of memory switch 412 open. A limit switch 517 positioned at the head of the output conveyor 187 is closed by the passage of the sandwich. At this point, cam operated timer switch 518 is momentarily opened. Should the sandwich for any reason fail to eject from the assembly area, switch 517 will not be closed and as a consequence the machine will be shut down via magnetic starter 442 and relay 444 as previously described in the specification.

In adapting the machine to the use of two alternate patty makers, suitable controls are provided. For this purpose, each patty maker is fitted with a limit switch 521 and 522 which close when the meat hopper is removed for filling. A magnetically operated reed switch 523 and 524, respectively, placed immediately outside the meat hopper is, when the hopper is substantially empty, closed by a magnet 120 (see FIG. 11) attached to the ground meat pressure plate 130 within the meat hopper. Thus, when the hopper is either nearly empty or removed for refilling, relays 525 or 526, respectively, will be energized. The corresponding signal lights 527 and 528, respectively, are also lighted.

Assuming initially that both meat hoppers are full, both relays 525 and 526 will be de-energized; the normally opened contact 529 on relay 525 will be open and the normally closed contact 530 on relay 526 will be closed. Thus relay 531 will be de-energized and its contact 555 will be open. In this condition, solenoid 396 cannot be energized and the pins on the inner memory track 384 will remain out of engagement with the memory switches 427 through 430. Under these conditions, the patty maker controlled by solenoid 458 will operate until substantially empty when reed switch 523 closes. Closure of reed switch 523 energizes relay 525 thus closing its contact 529 which in turn energizes relay 531. Contact 555 of relay 531 is thus closed and at every subsequent machine cycle, solenoid 396 will be pulsed through the cam operated switch 456 so moving out the pins 378 on the inner memory track 384. The memory pins 378 in this position operate switches 427 through 430 and thus dispense meat from the patty maker controlled by 457. At this point, the light 527 goes on indicating that the empty patty maker should be refilled. After refilling, relay 525 will be de-energized thus opening its contact 529.

It should be noted that relay 531 is held energized through its contact 532 and that meat continues to be dispensed from the patty maker which responds solenoid valve 457 until it in turn is substantially empty and closes reed switch 524. Reed switch 524 then closes relay 526 and, its normally closed contact 530 thereupon opens and de-energizes relay 531. Contact 555 of relay 531 now opens and prevents further energizing of solenoid 396. Memory switches 427 through 430 are thus not actuated and the patty maker controlled by solenoid valve 458 is again brought into use. In the event that both patty maker hoppers 112 and 113 are empty at the same time, contact 533 on relay 525 and contact 534 on relay 526 will both be open. This prevents any further signals from the ordering system from being transmitted to the solenoids 397, 398 and 399 and no further sandwiches are programmed into the machine until the hoppers are replenished.

As mentioned hereinbefore in the specification in conjunction with the memory device, the programming of cheeseburgers and hamburgers is very similar to that of the doubleburger. For this purpose, solenoids 397 or 398 are pulsed by switch 456 when the appropriate signals are given by the ordering system as described for solenoid 399. Memory pins in the appropriate tracks 382 or 383 are actuated by the solenoids 398 or 397, respectively.

Memory switches 414 or 415 for the cheeseburger or 422 or 423 for the hamburger subsequently initiate the dispensing of the patties from one or other patty molding units 112 or 113. Memory switches 416 or 424 dispense a two part bun for the cheeseburger or hamburger respectively, by operation of solenoid valve 538 and hence its associated air cylinder 94. For the cheeseburger, memory switches 417 and 419 initiate pick-up and deposition of cheese while memory switch 418 initiates arm swing, wrapper feed and air supply to the assembly area. For the hamburger, switch 425 initiates wrapper feed and assembly air supply but contacts from this switch are not included in the circuit controlling relay 489 so that the cheese and lettuce transfer arm 264 remains in its pick-up position and lifting of the cheese loaf and cutting of the cheese is prevented by contacts 501 on relay 489.

The memory switches 420 and 426, in addition to operating the safety circuit in the same manner as switch 412 through contacts 420A, 426A, have additional contacts 420B and 426B to operate the diverter solenoids 196 and 197. With respect to cheeseburgers, contacts 420B close and energize diverter solenoid 196 which swings the diverter arm to the correct angle and closes limit switch 539. Solenoid 196 remains energized through switch 539 and cam operated timer switch 541 for a sufficient length of time for the sandwich to be diverted. Switch 541 then pulses open and the solenoid 196 is de-energized.

The hamburger circuit is identical and comprises memory switch contacts 426B, solenoid 197 and limit switch 543.

Shut down of the machine is by actuation of stop button 564.

Operation of the bun store and slicing arrangement, which comprises a self-contained unit, will be described in conjunction with the circuit diagram of FIG. 33. The store functions to hold two sizes of buns and to slice these buns. One size is for doubleburgers having three slices and the other for the hamburger and cheeseburger having two slices. These sliced buns are delivered by this mechanism at its output stations ready for dispensing onto the bun transport conveyor by the programmed air cylinders 93 and 94, respectively (see FIG. 6).

When a doubleburger bun is at its output station, it contacts a sensing plate or vane 89 and opens the limit switch 546. When this bun is dispensed by the programmed air cylinder 93, the switch 546 is closed and relay 547 is thereby closed. Contact 548 of relay 547 closes and through magnetic starter 544 the slicing band motor 545 is started. Contacts 549 and 550 of relay 547 also close and energize two leads of the bun conveyor motor 551 and the bun store motor 552. The third lead of each of these motors is permanently connected. Motors 551 and 552 run until a sliced bun is again positioned at the output station and through the sensing plate opens switch 546. The operation of dispensing a two slice bun is similar to the dispensing of three slice buns. Components 546 through 552 of the double bun store are duplicated by similar components 556 through 562, respectively, of the single bun store.

To load the bun store, it is necessary to run the bun store motor independently of the automatic operation. For this purpose, two double pole switches 553 and 563, each incorporating an off position, are provided for the double and single bun store motors, respectively. These enable the leads from relay contacts 549–550 and 559–560, respectively, to be disconnected from the motors 552 and 562 respectively, and to be connected in the alternate to a separate power supply.

The double bun store has, in addition, a sensing plate which opens the double pole limit switch 554 when a bun, which is oversized and might jam at a later stage in the machine, passes under it. Action of this switch 554 will stop motor 552 until the oversized bun is manually removed. A safety of this type may be used but is not of comparable necessity on the single bun store.

It will be apparent from the preceding description that the invention provides a distinct apparatus which incorporates a plurality of novel features. These features in turn provide a novel combination comprising an automated mechanism which dispenses, cooks and assembles a plurality of ingredients to form a complete sandwich.

Various modifications within the purview of one skilled in the art may of course be made in the construction and arrangement of various elements illustrated herein in detail for the purpose of providing a complete disclosure. Accordingly, the above described details in the elements of the invention should be considered as illustrative and not as limiting the scope of the following claims.

We claim:

1. A machine for automatically transporting, cooking and assembling elements of a sandwich, comprising a frame and, mounted on said frame in coordinate relationship, a plurality of components including:
   a first endless conveyor to transport bun slices arranged thereon in destacked relationship;
   a second endless conveyor to transport patties delivered thereto from a patty supplying unit;
   a sandwich filler patty supplying unit arranged to deliver patties to said second conveyor;
   an oven comprising a direct heat chamber through which said second conveyor passes for cooking patties carried on said conveyor;
   an assembly mechanism for transferring the bun slices and cooked patties from said first and second conveyors, and stacking them in superimposed relationship, to form an assembled sandwich ready for consumption; and
   driving means providing motive power for said meat patty unit, conveyors and assembly mechanism.

2. The machine of claim 1 in which said second endless conveyor comprises a plurality of spaced bands upon which said patties are borne and a pulley for said bands on the next exit side of said oven, said pulley containing peripheral grooves in the surface thereof within which said bands are guided, said grooves, as said bands pass therein, having the effect of lifting and separating patties carried by said bands.

3. A machine for preparing various types of hamburger sandwiches in which the machine stores and automatically feeds, cooks and assembles the several ingredients of a sandwich, said machine comprising a frame and, mounted on said frame in coordinate relationship a plurality of components including:
   a bun storage and feed bin and means associated therewith for dispensing buns from said bin;
   a bun slicer to which buns delivered from said bin are fed for slicing and from which sliced buns are delivered;
   transfer means to convey buns dispensed from said bin to said slicer;
   a meat patty supplying unit housed in a refrigerated container;
   a first endless conveyor to transport sliced buns delivered from said slicer;
   a destacking means whereby superimposed slices of sliced buns are separated and carried as individual slices on said first conveyor;
   a second endless conveyor to transport meat patties delivered from said meat patty unit;
   an oven comprising a direct heat chamber through which said second conveyor passes for cooking said meat patty and a second chamber through which said first conveyor passes for heating said sliced bun;
   an assembly mechanism for buns and patties for selectively stacking, in superimposed relationship, bun slices and patties to form an assembled sandwich ready for consumption; and
   driving means, providing motive power in proper sequence for said slicer, meat patty unit, transfer means, conveyors and assembly mechanism.

4. A machine for containing and automatically feeding, cooking and assembling elements of a sandwich, comprising a frame and, mounted on said frame in coordinate relationship a plurality of components including:
   a bun slicer to which buns from said bin delivered to said chute are fed for slicing and from which said buns are delivered;
   transfer means to convey buns delivered from said bin to said slicer;
   a meat patty supplying unit housed in a refrigerated container;
   a first endless conveyor to transport sliced buns delivered from said slicer;
   a destacking means whereby superimposed slices of sliced buns are separated and carried as individual slices on said first conveyor;
   a second endless conveyor to transport meat patties delivered from said meat patty unit;
   an oven comprising a direct heat chamber through which said second conveyor passes for cooking said meat patty and a second chamber through which said first conveyor passes for heating said sliced bun;
   an assembly mechanism for buns and patties for selectively stacking, in superimposed relationship, bun slices and patties to form an assembled sandwich ready for consumption;
   driving means providing motive power in proper sequence for said slicer, meat patty unit, transfer means, conveyors and assembly mechanism; and
   a wrapping mechanism for said assembled sandwich comprising a cylindrical recess over which a wrapper is placed and drawn into said recess with the aid of vacuum applied beneath said wrapper and into which the assembled sandwich is drawn and enclosed as the peripheral portions of said sheet are drawn together to form a closure as the wrapper is drawn into said recess, and means providing vacuum under under said sheet.

5. The machine of claim 4 which is further provided with an exit conveyor upon which a wrapped sandwich is desposited and a selective diverter on said exit conveyor wherein said diverter is electrically actuated to control the direction of movement of sandwiches delivered by said assembly and wrapping mechanism.

6. A machine for preparing hamburger sandwiches in which the machine stores and automatically feeds, cooks and assembles the several ingredients of a sandwich, said machine comprising a frame and, mounted on said frame in coordinate relationship a plurality of components including:
   a bun storage and feed bin and means comprising a pivotal deflecting arm for directing buns dispensed from said bin;
   a bun slicer to which buns delivered from said bin are fed for slicing and from which sliced buns are delivered;
   transfer means comprising a conveyor belt to convey buns from said bin to said slicer;
   a meat patty supply and molding unit housed in a refrigerated container;
   a first endless conveyor to transport sliced buns delivered from said slicer;
   a destacking means whereby superimposed slices of sliced buns are separated and carried as individual slices on said first conveyor;
   a second endless conveyor comprising spaced metallic bands to transport meat patties delivered from said meat patty unit;
   an oven comprising a direct heat chamber through which said second conveyor passes for cooking said meat patty and a second chamber through which said first conveyor passes for heating said sliced bun;

an assembly mechanism for buns and patties comprising means for selectively stacking, in superimposed relationship, bun slices and patties to form an assembled sandwich ready for consumption; and driving means providing motive power for said slicer, meat patty unit, transfer means, conveyors, and assembly mechanism.

7. The machine of claim 6 which is further provided with: a bag forming mechanism for said assembled sandwich, said bag forming mechanism comprising an assembled sandwich receptacle comprised of a plurality of telescoping cylinderical sections over which a sheet of wrapper is placed and into which said wrapper is drawn with the aid of vacuum applied through said sections and beneath said wrapper and as said sections are extended; means for providing vacuum in said telescoping sections and for extending said sections; an exit conveyor for said wrapped sandwich; and a diverter on said exit conveyor which is connected electrically with the sandwich forming mechanism of said machine to control the direction of movement of sandwiches on said conveyor.

8. The machine of claim 7 which is provided with an electrical sequencer for initiating the functions of said machine and a timed memory device for storing orders for sandwiches and means actuating remotely through electrical impulses sequentially said slicer, meat patty unit transfer means, assembly mechanism and bag forming mechanism of said machine.

9. The machine of claim 6 which is further provided with a cheese dispensing mechanism comprising a cheese loaf storing container, an automatic loaf feeding and slicing arrangement on said container for slicing a cheese loaf stored in said container and a cheese slice transfer mechanism for delivery of a cheese slice to said sandwich prior to completion of assembly thereof.

10. The machine of claim 9 which is further provided with means for delivery of shredded lettuce and sauce for inclusion into said sandwich prior to completion of assembly thereof.

11. A bread roll storage and feeding mechanism comprising a pair of discrete endless chain conveyors, a pair of spaced substantially vertical mounts, a plurality of sprocket disks mounted for rotation on said mounts, said conveyors being carried by and arranged for movement in a substantially spiral path upon said sprocket disks, an endless sequence of bread roll carrying plates secured to said chain conveyors, an exit chute positioned contiguous to each of said conveyors to receive rolls carried by said conveyors, a pivotal roll deflector adjacent to each of said conveyors normally positioned to deflect the flow of rolls carried by said conveyors into said exit chutes and movable to an inoperative position permitting undeflected flow of the rolls carried by the conveyors, means for driving said conveyors, a roll slicing mechanism for rolls delivered to each of said exit chutes and means for transferring sliced rolls fed from each of said chutes to a receiver for said rolls.

12. A bread roll storage, feeding, slicing and destacking mechanism comprising an endless conveyor, a pair of spaced substantially vertical mounts, said conveyor mounted on said vertical mounts for movement in a spiral path, bread roll carrying plates secured to said conveyor, an exit chute positioned contiguous to said conveyor to receive rolls carried by said conveyor, a pivotal roll deflector adjacent to said conveyor normally positioned to deflect the flow of rolls carried by said conveyor into said exit chute and movable to an inoperative position permitting undeflected flow of the rolls carried by the conveyors, means for driving said conveyor, a roll slicing mechanism for rolls delivered to said exit chute and a destacking device comprising a pivotal retaining arm and a moving belt which carries the sliced roll in stacked relationship from said slicing mechanism under said pivotal retaining arm, said retaining arm being arranged so as to permit only the lowermost slice to be advanced by said belt as said pivotal arm is depressed an means electrically actuated to raise said pivotal arm only when a single slice of a bread roll remains.

13. A mechanism for picking up from discrete stations and assembling in stacked relationship a plurality of items comprising:

an assembly well into which items are deposited;
a rotatable element comprising a bifurcated arm for sweeping items from said discrete stations, a deck onto which said items are swept by said arm and upon which said items are borne to said assembly well, a pivotal linkage connecting said bifurcated arm to said deck allowing said arm to retract as said rotating element passes over said assembly well and to extend sufficiently to sweep items from said stations to said deck as said element passes the said stations;

means positioned adjacent said assembly well to sweep therein said items from said deck; and means to rotate said rotating element.

References Cited by the Examiner
UNITED STATES PATENTS

| | | | |
|---|---|---|---|
| 1,248,249 | 11/1917 | Bjorkman | 107—1.6 |
| 1,297,569 | 3/1919 | Johnson | 198—159 X |
| 1,513,476 | 10/1924 | Blain | 31—13 |
| 1,523,971 | 1/1925 | Johnsen | 198—136 |
| 1,665,888 | 4/1928 | Litty | 146—72 |
| 1,716,266 | 6/1929 | Flamm | 107—1.6 |
| 2,068,144 | 1/1937 | McAleer | 53—221 |
| 2,260,832 | 10/1941 | Deutscher | 107—1 |
| 2,348,176 | 5/1944 | Gott et al. | 99—174 |
| 2,380,564 | 7/1945 | Wennmann | 146—62 |
| 2,569,711 | 10/1951 | Foster | 198—102 X |
| 2,621,818 | 12/1952 | Sestilio | 214—310 |
| 2,626,575 | 1/1953 | Whitsel | 107—1.6 |
| 2,656,659 | 10/1953 | Buechek | 53—221 |
| 2,677,943 | 5/1954 | Nelson et al. | 107—8 X |
| 2,751,118 | 6/1956 | Soule | 222—80 |
| 2,844,472 | 7/1958 | Ehrenfried et al. | 99—174 |
| 2,917,990 | 12/1959 | Ehrenberg | 99—386 |
| 3,022,903 | 2/1962 | Weil | 214—1 |
| 3,113,530 | 12/1963 | Vestermark | 107—1.6 |

WALTER A. SCHEEL, *Primary Examiner.*

ROBERT E. PULFREY, CHARLES A. WILLMUTH, *Examiners.*

J. SHEA, *Assistant Examiner.*